(12) United States Patent
Yukie et al.

(10) Patent No.: US 9,275,312 B2
(45) Date of Patent: Mar. 1, 2016

(54) PRINT CONTROL APPARATUS, PRINT CONTROL SYSTEM, AND PRINT CONTROL METHOD TO DETERMINE A SURFACE-EFFECT SELECTION TABLE CORRESPONDING TO AN ACQUIRED PIECE OF RECORDING MEDIUM INFORMATION

(71) Applicants: Itsuo Yukie, Tokyo (JP); Hiroaki Suzuki, Chiba (JP); Yuichi Habu, Ibaraki (JP)

(72) Inventors: Itsuo Yukie, Tokyo (JP); Hiroaki Suzuki, Chiba (JP); Yuichi Habu, Ibaraki (JP)

(73) Assignee: RICOH COMPANY, LIMITED, Tokyo (JP)

( * ) Notice: Subject to any disclaimer, the term of this patent is extended or adjusted under 35 U.S.C. 154(b) by 114 days.

(21) Appl. No.: 13/863,684

(22) Filed: Apr. 16, 2013

(65) Prior Publication Data

US 2013/0278953 A1  Oct. 24, 2013

(30) Foreign Application Priority Data

Apr. 18, 2012  (JP) .................................. 2012-095164
Apr. 18, 2012  (JP) .................................. 2012-095167
Mar. 15, 2013  (JP) .................................. 2013-054436

(51) Int. Cl.
G06K 15/02  (2006.01)
G06F 3/12   (2006.01)

(52) U.S. Cl.
CPC .............. *G06K 15/02* (2013.01); *G06F 3/1208* (2013.01); *G06F 3/1232* (2013.01); *G06F 3/1247* (2013.01); *G06F 3/1288* (2013.01)

(58) Field of Classification Search
CPC combination set(s) only.
See application file for complete search history.

(56) References Cited

U.S. PATENT DOCUMENTS

| 6,438,336  | B1  | 8/2002 | Bengtson |
| 7,024,149  | B2  | 4/2006 | Kito et al. |
| 8,417,135  | B2  | 4/2013 | Mestha et al. |
| 8,531,724  | B2  | 9/2013 | Iinuma |
| 2006/0119874 | A1* | 6/2006 | Kurihara .................. 358/1.13 |

(Continued)

FOREIGN PATENT DOCUMENTS

| JP | 2011-043683 | 3/2011 |
| JP | 2011-150158 | 8/2011 |

OTHER PUBLICATIONS

U.S. Appl. No. 13/863,661, filed Apr. 16, 2013, Yukie, et al.

(Continued)

*Primary Examiner* — Mohammad Ghayour
*Assistant Examiner* — Christopher D Wait
(74) *Attorney, Agent, or Firm* — Oblon, McClelland, Maier & Neustadt, L.L.P.

(57) ABSTRACT

A print control apparatus includes a storage unit configured to store surface-effect selection tables for respective pieces of recording medium information on a recording medium, different types of same surface effects being registered in each surface-effect selection table; an acquiring unit configured to acquire a piece of recording medium information; a table generating unit configured to generate a surface-effect selection table corresponding to the piece of recording medium information and store the surface-effect selection table in the storage unit; a determining unit configured to determine the surface-effect selection table; and an image data generating unit configured to generate image data based on the surface-effect selection table and based on gloss-control plane data in which a type of a surface effect to be applied to the recording medium and an area of the recording medium to which the surface effect is to be applied are specified.

20 Claims, 31 Drawing Sheets

(56) References Cited

U.S. PATENT DOCUMENTS

2011/0182607 A1    7/2011    Takemura
2012/0062956 A1    3/2012    Kitagawa et al.
2012/0063802 A1    3/2012    Suzuki et al.
2012/0237244 A1*    9/2012    Yoshikawa et al. ............. 399/67
2013/0279958 A1*    10/2013    Yukie et al. ................... 399/341

OTHER PUBLICATIONS

U.S. Appl. No. 13/863,661, filed Apr. 16, 2013.

Office Action issued Nov. 13, 2014, in the corresponding U.S. Appl. No. 13/863,661.

* cited by examiner

| NAME OF GLOSS CONTROL | GLOSSINESS | DEVIATION |
|---|---|---|
| PREMIUM GLOSS (PG) | Gs ≥ 80 | ΔGs ≤ 10 |
| GLOSS (G) | Gs=Gs (SOLID GLOSS) | ΔGs ≤ 10 |
| MATTE (M) | Gs = Gs (1C WITH 30% OF HALFTONE DOTS) | ΔGs ≤ 10 |
| PREMIUM MATTE (PM) | Gs ≤ 10 | ΔGs ≤ 10 |

GLOSS-CONTROL PLANE DATA

▨ : PG-SPECIFIED REGION (DENSITY VALUE: 98%)

▧ : G-SPECIFIED REGION (DENSITY VALUE: 90%)

▭ : M-SPECIFIED REGION (DENSITY VALUE: 16%)

CLEAR PLANE DATA

| TYPE OF SURFACE EFFECT SPECIFIED BY USER | DENSITY VALUE IN GLOSS-CONTROL PLANE DATA (%) |
|---|---|
| PG | 98% |
| G | 90% |
| M | 16% |
| PM | 6% |

| DRAWING OBJECT | COORDINATE | DENSITY VALUE |
|---|---|---|
| A, B, C | (x1, y1) - (x2, y2) | 98% |
| (RECTANGLE) | (x3, y3) - (x4, y4) | 90% |
| ... | ... | ... |

FIG.11

COATED PAPER

| DENSITY (%) | DENSITY REPRESENTATIVE VALUE | DENSITY VALUE RANGE | | EFFECT | GLOSSER ON/OFF (ON-OFF INFORMATION) | CLEAR-TONER PLANE DATA 1 (PRINTER) | CLEAR-TONER PLANE DATA 2 (LOW-TEMPERATURE FIXING DEVICE) |
|---|---|---|---|---|---|---|---|
| 98% | 250 | 248 | 255 | PREMIUM GLOSS TYPE A | ON | INVERSE MASK A | NO DATA |
| 96% | 245 | 243 | 247 | PREMIUM GLOSS TYPE B | ON | INVERSE MASK B | NO DATA |
| 94% | 240 | 238 | 242 | PREMIUM GLOSS TYPE C | ON | INVERSE MASK C | NO DATA |
| 92% | 235 | 233 | 237 | RESERVED | | | |
| 90% | 230 | 228 | 233 | GLOSS TYPE 1 | OFF | INVERSE MASK 1 | NO DATA |
| 88% | 224 | 222 | 227 | GLOSS TYPE 2 | OFF | INVERSE MASK 2 | NO DATA |
| 86% | 219 | 217 | 221 | GLOSS TYPE 3 | OFF | INVERSE MASK 3 | NO DATA |
| 84% | 214 | 212 | 216 | GLOSS TYPE 4 | OFF | INVERSE MASK 4 | NO DATA |
| 82% | 209 | 207 | 211 | RESERVED | | | |
| ... | ... | ... | ... | ... | ... | ... | ... |
| 46% | 117 | 115 | 119 | RESERVED | | | |
| 44% | 112 | 110 | 114 | WATERMARK CHARACTER 3 (XXX) | OFF | NO DATA | TILE STRING 3 |
| 42% | 107 | 105 | 109 | WATERMARK CHARACTER 2 (COPY PROHIBITED) | | NO DATA | TILE STRING 2 |
| 40% | 102 | 100 | 104 | WATERMARK CHARACTER 1 (SAMPLE) | | NO DATA | TILE STRING 1 |
| 38% | 97 | 95 | 99 | RESERVED | | | |
| 36% | 92 | 90 | 94 | RESERVED | | | |
| 34% | 87 | 85 | 89 | BACKGROUND PATTERN 3 (XXX) | | NO DATA | TILE BACKGROUND PATTERN 3 |
| 32% | 82 | 80 | 84 | BACKGROUND PATTERN 2 (LATTICE) | | NO DATA | TILE BACKGROUND PATTERN 2 |
| 30% | 76 | 74 | 79 | BACKGROUND PATTERN 1 (WAVE) | | NO DATA | TILE BACKGROUND PATTERN 1 |
| 28% | 71 | 69 | 73 | RESERVED | | | |
| 26% | 66 | 64 | 68 | RESERVED | | | |
| 24% | 61 | 59 | 63 | TEXTURE PATTERN TYPE 3 (ROUGH) | | NO DATA | TILE MESH PATTERN 3 |
| 22% | 56 | 54 | 58 | TEXTURE PATTERN TYPE 2 (MODERATE) | | NO DATA | TILE MESH PATTERN 2 |
| 20% | 51 | 49 | 53 | TEXTURE PATTERN TYPE 1 (FINE) | | NO DATA | TILE MESH PATTERN 1 |
| 18% | 46 | 44 | 48 | RESERVED | | | |
| 16% | 41 | 39 | 43 | MATTE TYPE 4 | OFF | HALFTONE 4 | NO DATA |
| 14% | 36 | 34 | 38 | MATTE TYPE 3 | OFF | HALFTONE 3 | NO DATA |
| 12% | 31 | 29 | 33 | MATTE TYPE 2 | OFF | HALFTONE 2 | NO DATA |
| 10% | 25 | 23 | 28 | MATTE TYPE 1 | OFF | HALFTONE 1 | NO DATA |
| 8% | 20 | 18 | 22 | RESERVED | | | |
| 6% | 15 | 13 | 17 | PREMIUM MATT TYPE C | ON&OFF | NO DATA | SOLID |
| 4% | 10 | 8 | 12 | PREMIUM MATT TYPE B | ON&OFF | NO DATA | SOLID |
| 2% | 5 | 1 | 7 | PREMIUM MATT TYPE A | ON&OFF | NO DATA | SOLID |
| 0% | 0 | 0 | 0 | NOTHING | OFF | NO DATA | NO DATA |

FIG.12

PLAIN PAPER

| DENSITY (%) | DENSITY REPRESENTATIVE VALUE | VALUE RANGE | | EFFECT | GLOSSER ON/OFF (ON-OFF INFORMATION) | CLEAR-TONER PLANE DATA 1 (PRINTER) | CLEAR-TONER PLANE DATA 2 (LOW-TEMPERATURE FIXING DEVICE) |
|---|---|---|---|---|---|---|---|
| 98% | 250 | 248 | 255 | PREMIUM GLOSS TYPE A | ON | INVERSE MASK A | NO DATA |
| 96% | 245 | 243 | 247 | PREMIUM GLOSS TYPE A | ON | INVERSE MASK A | NO DATA |
| 94% | 240 | 238 | 242 | PREMIUM GLOSS TYPE B | ON | INVERSE MASK B | NO DATA |
| 92% | 235 | 233 | 237 | RESERVED | | | |
| 90% | 230 | 228 | 232 | GLOSS TYPE 1 | OFF | INVERSE MASK 1 | NO DATA |
| 88% | 224 | 222 | 227 | GLOSS TYPE 1 | OFF | INVERSE MASK 1 | NO DATA |
| 86% | 219 | 217 | 221 | GLOSS TYPE 2 | OFF | INVERSE MASK 2 | NO DATA |
| 84% | 214 | 212 | 216 | GLOSS TYPE 3 | OFF | INVERSE MASK 3 | NO DATA |
| 82% | 209 | 207 | 211 | RESERVED | | | |
| 46% | 117 | 115 | 119 | RESERVED | | | |
| 44% | 112 | 110 | 114 | WATERMARK CHARACTER 3 (XXX) | OFF | NO DATA | TILE STRING 3 |
| 42% | 107 | 105 | 109 | WATERMARK CHARACTER 2 (COPY PROHIBITED) | | NO DATA | TILE STRING 2 |
| 40% | 102 | 100 | 104 | WATERMARK CHARACTER 1 (SAMPLE) | | NO DATA | TILE STRING 1 |
| 38% | 97 | 95 | 99 | RESERVED | | | |
| 36% | 92 | 90 | 94 | RESERVED | | | |
| 34% | 87 | 85 | 89 | BACKGROUND PATTERN 3 (XXX) | | NO DATA | TILE BACKGROUND PATTERN 3 |
| 32% | 82 | 80 | 84 | BACKGROUND PATTERN 2 (LATTICE) | | NO DATA | TILE BACKGROUND PATTERN 2 |
| 30% | 76 | 74 | 79 | BACKGROUND PATTERN 1 (WAVE) | | NO DATA | TILE BACKGROUND PATTERN 1 |
| 28% | 71 | 69 | 73 | RESERVED | | | |
| 26% | 66 | 64 | 68 | RESERVED | | | |
| 24% | 61 | 59 | 63 | TEXTURE PATTERN TYPE 3(ROUGH) | | NO DATA | TILE MESH PATTERN 3 |
| 22% | 56 | 54 | 58 | TEXTURE PATTERN TYPE 2(MODERATE) | | NO DATA | TILE MESH PATTERN 2 |
| 20% | 51 | 49 | 53 | TEXTURE PATTERN TYPE 1(FINE) | | NO DATA | TILE MESH PATTERN 1 |
| 18% | 46 | 44 | 48 | RESERVED | | | |
| 16% | 41 | 39 | 43 | MATTE TYPE 4 | OFF | HALFTONE 4 | NO DATA |
| 14% | 36 | 34 | 38 | MATTE TYPE 4 | OFF | HALFTONE 4 | NO DATA |
| 12% | 31 | 29 | 33 | MATTE TYPE 3 | OFF | HALFTONE 3 | NO DATA |
| 10% | 25 | 23 | 28 | MATTE TYPE 2 | OFF | HALFTONE 2 | NO DATA |
| 8% | 20 | 18 | 22 | RESERVED | | | |
| 6% | 15 | 13 | 17 | PREMIUM MATT TYPE C | ON&OFF | NO DATA | SOLID |
| 4% | 10 | 8 | 12 | PREMIUM MATT TYPE C | ON&OFF | NO DATA | SOLID |
| 2% | 5 | 1 | 7 | PREMIUM MATT TYPE B | ON&OFF | NO DATA | SOLID |
| 0% | 0 | 0 | 0 | NOTHING | OFF | NO DATA | NO DATA |

FIG.13

MATTE PAPER

| DENSITY (%) | DENSITY REPRESENTATIVE VALUE | VALUE RANGE | | EFFECT | GLOSSER ON/OFF (ON-OFF INFORMATION) | CLEAR-TONER PLANE DATA 1 (PRINTER) | CLEAR-TONER PLANE DATA 2 (LOW-TEMPERATURE FIXING DEVICE) |
|---|---|---|---|---|---|---|---|
| 98% | 250 | 248 | 255 | PREMIUM GLOSS TYPE A | ON | INVERSE MASK A | NO DATA |
| 96% | 245 | 243 | 247 | PREMIUM GLOSS TYPE A | ON | INVERSE MASK A | NO DATA |
| 94% | 240 | 238 | 242 | PREMIUM GLOSS TYPE A | ON | INVERSE MASK A | NO DATA |
| 92% | 235 | 233 | 237 | RESERVED | | | |
| 90% | 230 | 228 | 232 | GLOSS TYPE 1 | OFF | INVERSE MASK 1 | NO DATA |
| 88% | 224 | 222 | 227 | GLOSS TYPE 1 | OFF | INVERSE MASK 1 | NO DATA |
| 86% | 219 | 217 | 221 | GLOSS TYPE 1 | OFF | INVERSE MASK 1 | NO DATA |
| 84% | 214 | 212 | 216 | GLOSS TYPE 1 | OFF | INVERSE MASK 1 | NO DATA |
| 82% | 209 | 207 | 211 | RESERVED | | | |
| 46% | 117 | 115 | 119 | RESERVED | | | |
| 44% | 112 | 110 | 114 | WATERMARK CHARACTER 3 (XXX) | OFF | NO DATA | TILE STRING 3 |
| 42% | 107 | 105 | 109 | WATERMARK CHARACTER 2 (COPY PROHIBITED) | | NO DATA | TILE STRING 2 |
| 40% | 102 | 100 | 104 | WATERMARK CHARACTER 1 (SAMPLE) | | NO DATA | TILE STRING 1 |
| 38% | 97 | 95 | 99 | RESERVED | | | |
| 36% | 92 | 90 | 94 | RESERVED | | | |
| 34% | 87 | 85 | 89 | BACKGROUND PATTERN 3 (XXX) | | NO DATA | TILE BACKGROUND PATTERN 3 |
| 32% | 82 | 80 | 84 | BACKGROUND PATTERN 2 (LATTICE) | | NO DATA | TILE BACKGROUND PATTERN 2 |
| 30% | 76 | 74 | 79 | BACKGROUND PATTERN 1 (WAVE) | | NO DATA | TILE BACKGROUND PATTERN 1 |
| 28% | 71 | 69 | 73 | RESERVED | | | |
| 26% | 66 | 64 | 68 | RESERVED | | | |
| 24% | 61 | 59 | 63 | TEXTURE PATTERN TYPE 3(ROUGH) | | NO DATA | TILE MESH PATTERN 3 |
| 22% | 56 | 54 | 58 | TEXTURE PATTERN TYPE 2(MODERATE) | | NO DATA | TILE MESH PATTERN 2 |
| 20% | 51 | 49 | 53 | TEXTURE PATTERN TYPE 1(FINE) | | NO DATA | TILE MESH PATTERN 1 |
| 18% | 46 | 44 | 48 | RESERVED | | | |
| 16% | 41 | 39 | 43 | MATTE TYPE 4 | OFF | HALFTONE 4 | NO DATA |
| 14% | 36 | 34 | 38 | MATTE TYPE 4 | OFF | HALFTONE 4 | NO DATA |
| 12% | 31 | 29 | 33 | MATTE TYPE 4 | OFF | HALFTONE 4 | NO DATA |
| 10% | 25 | 23 | 28 | MATTE TYPE 4 | OFF | HALFTONE 4 | NO DATA |
| 8% | 20 | 18 | 22 | RESERVED | | | |
| 6% | 15 | 13 | 17 | PREMIUM MATT TYPE C | ON&OFF | NO DATA | SOLID |
| 4% | 10 | 8 | 12 | PREMIUM MATT TYPE C | ON&OFF | NO DATA | SOLID |
| 2% | 5 | 1 | 7 | PREMIUM MATT TYPE C | ON&OFF | NO DATA | SOLID |
| 0% | 0 | 0 | 0 | NOTHING | OFF | NO DATA | NO DATA |

SHEET TYPE    – GLOSSINESS    – ROUGHNESS INFORMATION (SMOOTHNESS)
COATED PAPER – HIGH GLOSS    – FINE
PLAIN PAPER   – MEDIUM GLOSS –
MATTE PAPER  – LOW GLOSS    – ROUGH

FIG.27

☐ DISPLAY SURFACE-EFFECT SELECTION TABLE

| DISPLAY RESULT | | | TABLE (R MY PAPER) | |
|---|---|---|---|---|
| DEN-SITY (%) | DENSITY REPRE-SENTATIVE VALUE | VALUE RANGE | EFFECT | CLEAR-TONER PLANE DATA 1 (PRINTER) |
| 98% | 250 | 248 255 | PREMIUM GLOSS TYPE A | INVERSE MASK A |
| 96% | 245 | 243 247 | PREMIUM GLOSS TYPE B | INVERSE MASK B |
| 94% | 240 | 238 242 | PREMIUM GLOSS TYPE C | INVERSE MASK C |
| 92% | 235 | 233 237 | RESERVED | |
| 90% | 230 | 228 232 | GLOSS TYPE 1 | INVERSE MASK 1 |
| 88% | 224 | 222 227 | GLOSS TYPE 2 | INVERSE MASK 2 |
| 86% | 219 | 217 221 | GLOSS TYPE 3 | INVERSE MASK 3 |
| 84% | 214 | 212 216 | GLOSS TYPE 4 | INVERSE MASK 4 |
| 44% | 112 | 110 114 | WATERMARK CHARACTER 3 (XXX) | NO DATA |
| 42% | 107 | 105 109 | WATERMARK CHARACTER 2 (COPY PROHIBITED) | NO DATA |
| 40% | 102 | 100 104 | WATERMARK CHARACTER 1 (SAMPLE) | NO DATA |
| 38% | 97 | 95 99 | RESERVED | |
| 36% | 92 | 90 94 | RESERVED | |
| 34% | 87 | 85 89 | BACKGROUND PATTERN 3 (XXX) | NO DATA |
| 32% | 82 | 80 84 | BACKGROUND PATTERN 2 (LATTICE) | NO DATA |
| 30% | 76 | 74 79 | BACKGROUND PATTERN 1 (WAVE) | NO DATA |
| 28% | 71 | 69 73 | RESERVED | |
| 26% | 66 | 64 68 | RESERVED | |
| 24% | 61 | 59 63 | TEXTURE PATTERN TYPE 3 (ROUGH) | NO DATA |
| 22% | 56 | 54 58 | TEXTURE PATTERN TYPE 2 (MODERATE) | NO DATA |
| 20% | 51 | 49 53 | TEXTURE PATTERN TYPE 1 (FINE) | NO DATA |
| 18% | 46 | 44 48 | RESERVED | |
| 16% | 41 | 39 43 | MATTE TYPE 4 | HALFTONE 4 |
| 14% | 36 | 34 38 | MATTE TYPE 3 | HALFTONE 3 |
| 12% | 31 | 29 33 | MATTE TYPE 2 | HALFTONE 2 |
| 10% | 25 | 23 28 | MATTE TYPE 1 | HALFTONE 1 |
| 8% | 20 | 18 22 | RESERVED | |
| 6% | 15 | 13 17 | PREMIUM MATT TYPE C | NO DATA |
| 4% | 10 | 8 12 | PREMIUM MATT TYPE B | NO DATA |
| 2% | 5 | 1 7 | PREMIUM MATT TYPE A | NO DATA |
| 0% | 0 | 0 0 | NOTHING | NO DATA |

FIG.31

| | | USER NAME | RICOH TARO |

☐INPUT EVALUATION INFORMATION

SHEET NAME: R MY PAPER

| DENSITY (%) | EFFECT | | EVALUATION INFORMATION | |
|---|---|---|---|---|
| 98% | PREMIUM GLOSS | TYPE A | HIGH | ▼ |
| 96% | PREMIUM GLOSS | TYPE B | HIGH | ▼ |
| 94% | PREMIUM GLOSS | TYPE C | MODERATE | ▼ |
| 92% | GLOSS | TYPE 1 | MODERATE | ▼ |
| 90% | GLOSS | TYPE 2 | MODERATE | ▼ |
| 88% | GLOSS | TYPE 3 | LOW | ▼ |
| 86% | GLOSS | TYPE 4 | LOW | ▼ |
| 12% | MATTE | TYPE 2 | HIGH | ▼ |
| 10% | MATTE | TYPE 1 | MODERATE | ▼ |

[ OK ] [ CANCEL ]

PRINT CONTROL APPARATUS, PRINT CONTROL SYSTEM, AND PRINT CONTROL METHOD TO DETERMINE A SURFACE-EFFECT SELECTION TABLE CORRESPONDING TO AN ACQUIRED PIECE OF RECORDING MEDIUM INFORMATION

CROSS-REFERENCE TO RELATED APPLICATIONS

The present application claims priority to and incorporates by reference the entire contents of Japanese Patent Application No. 2012-095164 filed in Japan on Apr. 18, 2012, Japanese Patent Application No. 2012-095167 filed in Japan on Apr. 18, 2012, and Japanese Patent Application No. 2013-54436 filed in Japan on Mar. 15, 2013.

BACKGROUND OF THE INVENTION

1. Field of the Invention

The present invention relates to a print control apparatus, a print control system, and a print control method.

2. Description of the Related Art

Conventionally, there is an image forming apparatus provided with a clear toner that is a colorless toner containing no color material, in addition to toners of four colors of C (cyan), M (magenta), Y (yellow), and K (black). A toner image formed with the clear toner is fixed to a recording medium, such as a sheet of paper, on which an image is already formed with the CMYK toners, so that a visual effect or a tactual effect (hereinafter, referred to as a "surface effect") can be realized on the recording medium.

The surface effect to be realized varies depending on what toner image is formed with the clear toner and how the toner image is fixed. Some surface effects simply apply gloss and other surface effects reduce gloss. In addition, there are different needs, such as a need to apply the surface effect to the whole surface of a sheet, a need to apply the surface effect to a part of the surface, and a need to apply a texture or a watermark with the clear toner. There is also a need for surface protection Some surface effects are realized by performing post processing by a special post-processor, such as a glosser or a low-temperature fixing device, rather than by controlling fixation. In recent years, as disclosed in Japanese Patent Application Laid-open No. 2011-150158 for example, a technology has been developed to attach a clear toner to only a desired portion in a part of the surface to apply gloss.

Furthermore, to output appropriate glossiness when an image is formed on a sheet having different surface glossiness, smoothness, or thickness, Japanese Patent Application Laid-open No. 2011-43683 discloses an image forming apparatus that measures glossiness of a sheet and changes a heat condition including a fixing temperature according to the glossiness so that an image with appropriate glossiness can be output.

However, in the conventional gloss control technology, when a surface effect, such as specular gloss, that is greatly influenced by the smoothness of a sheet is to be applied to a sheet having large surface irregularities, the surface effect varies and a surface effect desired by a user may not be obtained, which is a problem.

Therefore, there is a need for a print control apparatus, a print control system, and a print control method capable of obtaining a surface effect as desired by a user regardless of a type of a sheet.

SUMMARY OF THE INVENTION

It is an object of the present invention to at least partially solve the problems in the conventional technology.

According to an embodiment, there is provided a print control apparatus that includes a storage unit configured to store therein a plurality of surface-effect selection tables for respective pieces of recording medium information on a recording medium, different types of same surface effects being registered in each of the surface-effect selection tables; an acquiring unit configured to acquire a piece of recording medium information; a table generating unit configured to generate a surface-effect selection table corresponding to the acquired piece of recording medium information and store the generated surface-effect selection table in the storage unit when the acquired piece of recording medium information is not stored in the storage unit; a determining unit configured to determine the surface-effect selection table corresponding to the acquired piece of recording medium information from the storage unit; an image data generating unit configured to generate image data based on the determined surface-effect selection table and based on gloss-control plane data in which a type of a surface effect to be applied to the recording medium and an area of the recording medium to which the surface effect is to be applied are specified; and an output unit configured to output the image data.

According to another embodiment, there is provided a print control system that includes a storage unit configured to store therein a plurality of surface-effect selection tables for respective pieces of recording medium information on a recording medium, different types of same surface effects being registered in each of the surface-effect selection tables; an acquiring unit configured to acquire a piece of recording medium information; a table generating unit configured to generate a surface-effect selection table corresponding to the acquired piece of recording medium information and store the generated surface-effect selection table in the storage unit when the acquired piece of recording medium information is not stored in the storage unit; a determining unit configured to determine the surface-effect selection table corresponding to the acquired piece of recording medium information from the storage unit; an image data generating unit configured to generate image data based on the determined surface-effect selection table and based on gloss-control plane data in which a type of a surface effect to be applied to the recording medium and an area of the recording medium to which the surface effect is to be applied are specified; and an output unit configured to output the image data.

According to still another embodiment, there is provided a print control method that includes acquiring a piece of recording medium information on a recording medium; a table generating unit configured to generate a surface-effect selection table corresponding to the acquired piece of recording medium information and store the generated surface-effect selection table in a storage unit when the acquired piece of recording medium information is not stored in the storage unit, the storage unit being configured to store therein a plurality of surface-effect selection tables for respective pieces of recording medium information on the recording medium, different types of same surface effects being registered in each of the surface-effect selection tables; determining the surface-effect selection table corresponding to the acquired piece of recording medium information from the storage unit; generating image data based on the determined surface-effect selection table and based on gloss-control plane data in which a type of a surface effect to be applied to the recording medium and an area of the recording medium to which the surface effect is to be applied are specified; and outputting the image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a diagram illustrating an exemplary data structure of a surface-effect selection table for coated paper;

FIG. 12 is a diagram illustrating an exemplary data structure of a surface-effect selection table for plain paper;

FIG. 13 is a diagram illustrating an exemplary data structure of a surface-effect selection table for matte paper;

FIG. 27 is a diagram illustrating an example of a search result screen;

FIG. 31 is a diagram illustrating an example of an evaluation information input screen;

DETAILED DESCRIPTION OF THE PREFERRED EMBODIMENTS

Exemplary embodiments of the present invention will be explained in detail below with reference to the accompanying drawings.

First Embodiment

Figure 1:
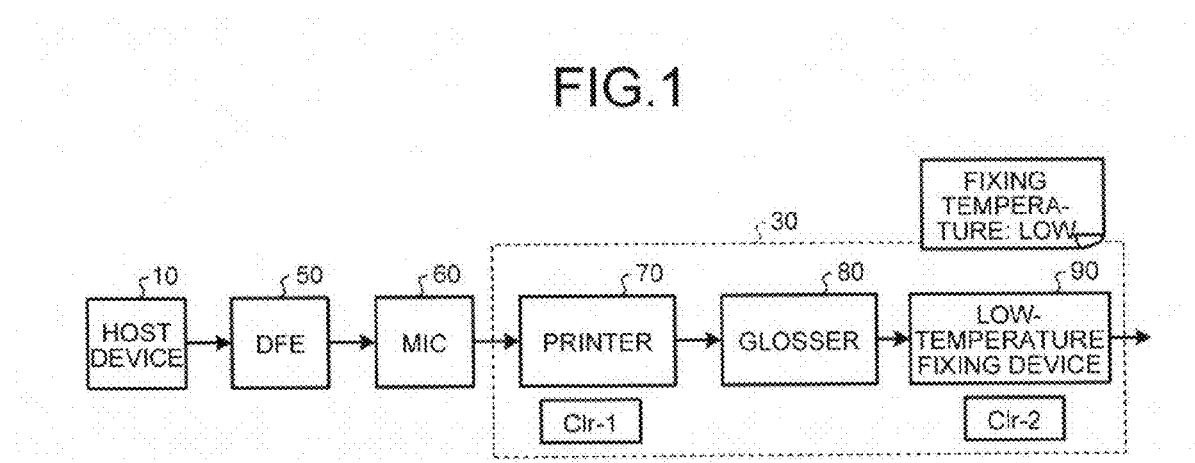
FIG. 1 is a diagram illustrating a configuration example of an image forming system according to a first embodiment.

A configuration of an image forming system according to a first embodiment will be explained below with reference to FIG. 1. In the first embodiment, the image forming system includes a printer control device (Digital Front End (DFE)) 50 (hereinafter, described as "the DFE 50"), an interface controller (Mechanism I/F controller (MIC)) 60 (hereinafter, described as "the MIC 60"), a printer 70, a glosser 80 as a post-processor, and a low-temperature fixing device 90 as a post-processor, which are connected to one another. The DFE 50 communicates with the printer 70 via the MIC 60 and controls image formation performed by the printer 70. The DFE 50 is connected to a host device 10, such as a personal computer (PC), receives image data from the host device 10, generates image data, to be used by the printer 70 to form toner images corresponding to CMYK toners and a clear toner by using the received image data, and sends the image data to the printer 70 via the MIC 60. The printer 70 is provided with at least the CMYK toners and the clear toner. The printer 70 includes image forming units for the respective toners, each including a photosensitive element, a charging unit, a developing unit, and a photosensitive-element cleaner, and includes an exposing unit and a fixing unit.

The printer 70, the glosser 80, and the low-temperature fixing device 90 constitute a printing apparatus 30.

The clear toner is a transparent (colorless) toner that does not contain a color material. The transparent (colorless) indicates that, for example, transmittance is 70% or greater.

The printer 70 emits a light beam from the exposing unit according to image data transmitted from the DFE 50 via the MIC 60 to thereby form toner images of the respective toners on the photoreceptors, transfers the toner images onto a sheet of paper that is a recording medium, and fixes the toner images to the sheet by applying heat and pressure at a temperature in a predetermined range (normal temperature) by the fixing unit. Therefore, an image is formed on the sheet. The configuration of the printer 70 as described above is widely known; therefore, detailed explanation thereof will be omitted. The sheet of paper is one example of the recording medium, and the recording medium is not limited to the sheet of paper. For example, a sheet of synthetic paper or plastic sheet may be used.

The glosser 80 is turned on or off based on on/off information designated by the DFE 50. When turned on, the glosser 80 presses the image formed on the sheet by the printer 70 at high temperature and high pressure, and thereafter separates the recording medium carrying the formed image from the main body of the glosser 80 by cooling the sheet. Therefore, the total adhesion amount of toners at each pixel, to which at least a predetermined amount of toners has been attached, can be uniformly compressed over the entire image formed on the sheet. The low-temperature fixing device 90 includes an image forming unit including a photoreceptor, a charger, a developing unit, and a photoreceptor cleaner for a clear toner, and also includes an exposing unit and a fixing unit for fixing the clear toner. The low-temperature fixing device 90 receives image data of a clear toner plane (hereinafter, described as "clear-toner plane data") that the DFE 50 has generated to use the low-temperature fixing device 90. When the DFE 50 generates the clear-toner plane data to be used by the low-temperature fixing device 90, the low-temperature fixing device 90 generates a clear toner image based on the clear-toner plane data, superimposes the clear toner image on the sheet pressed by the glosser 80, and fixes the clear toner image to the sheet by applying heat or pressure lower than normal by using the fixing unit.

Image data (document data) input by the host device 10 will be explained below. The host device 10 generates image data by a pre-installed image processing application and sends the image data to the DFE 50. The image processing application as described above can handle image data of a special color plane (hereinafter, described as "special-color plane data") with respect to image data in which a value of the density (density value) of a color of a color plane, such as an RGB plane or a CMYK plane is determined for each pixel. The special-color plane data is image data used for adding a special toner or ink, such as white, gold, or silver, in addition to basic colors, such as CMYK or RGB, and is used by a printer mounted with a special toner or ink. The special-color plane data may be used for adding R to CMYK basic colors or adding Y to RGB basic colors in order to improve color reproducibility. In general, the clear toner is handled as one of the special colors.

In the embodiments, a clear toner in a special color is used to form a surface effect that is a visual effect or a tactual effect to be applied to a sheet of paper, and to form a transparent image, such as a watermark or texture, other than the above-mentioned surface effect on the sheet.

Therefore, the image processing application of the host device 10 generates image data of a color plane (hereinafter, described as "color plane data") and also generates image data of a gloss control plane (hereinafter, described as "gloss-control plane data") and/or image data of a clear plane (hereinafter, described as "clear plane data") as the special-color plane data with respect to the input image data, according to designations given by a user.

Figure 2:
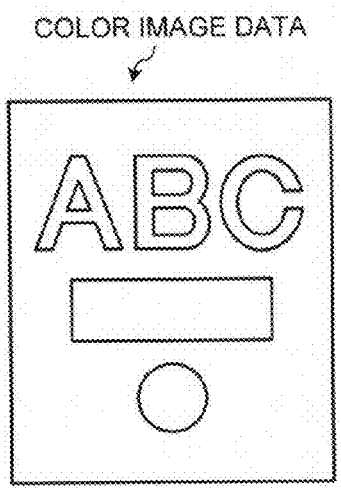
FIG. 2 is a diagram illustrating an example of color plane data.

The color plane data is image data in which a density value of a color, such as RGB or CMYK, is defined for each pixel. In the color plane data, one pixel is represented by 8 bits according to a color designated by a user. FIG. 2 is a diagram illustrating an example of the color plane data. In FIG. 2, a density value corresponding to the color designated by a user via the image processing application is applied to each of drawing objects, such as "A", "B", and "C".

The gloss-control plane data is image data in which an area to which a surface effect is to be applied and a type of the surface effect are specified in order to attach a clear toner according to the surface effect that is a visual effect or a tactual effect to be applied to a sheet of paper.

In the gloss-control plane data, the density value is represented by a value in a range from "0" to "255" based on 8 bits for each pixel similarly to the color plane data of RGB or CMYK, and a type of the surface effect is associated with the density value (the density value may be represented by a 16-bit value, a 32-bit value, or a value from 0% to 100%). The same density value is set for a range to which the same surface effect is applied, regardless of the density of the clear toner to be actually attached. Therefore, even when data indicating the area is not provided, it is possible to easily identify the area according to the image data if needed. Namely, the gloss-control plane data represents the type of a surface effect and an area to which the surface effect is applied (it may be possible to additionally provide data indicating the area).

The host device 10 generates the gloss-control plane data in a vector format by setting a type of a surface effect that is designated for each drawing object by a user via the image processing application, as a density value that is a gloss control value for each drawing object.

Pixels of the gloss-control plane data correspond to respective pixels of the color plane data. In each image data, a density value of each pixel serves as a pixel value. The color plane data and the gloss-control plane data are constructed in page units.

The types of the surface effects are roughly classified into a surface effect relating to presence or absence of gloss, a surface protection, a watermark in which information is buried, and a texture. The surface effect relating to presence or absence of gloss is roughly classified into four as illustrated by example in FIG. 3: specular gloss; solid gloss; halftone matte; and delustered in descending order of the degree of gloss (glossiness). Hereinafter, the specular gloss may be referred to as Premium Gloss (PG), the solid gloss by Gloss (G), the halftone matte by Matte (M), and the delustered by Premium Matte (PM).

Figures 3, 4:
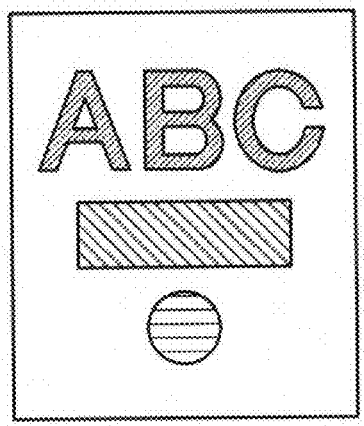
FIG. 3 is a diagram illustrating types of surface effects related to presence or absence of gloss.
FIG. 4 illustrates an image of gloss-control plane data.

Premium Gloss and Gloss apply a high degree of gloss. On the other hand, Matte and Premium Matte are used to suppress gloss. In particular, Premium Matte realizes the glossiness lower than the glossiness of a normal sheet of paper. In FIG. 3, Premium Gloss has a glossiness (Gs) of 80 or higher, Gloss has a solid glossiness (Gs) in a primary color or a secondary color, Matte has a glossiness (Gs) of 30% halftone dots in a primary color, and Premium Matte has a glossiness (Gs) of 10% or lower. The deviation in the glossiness is represented by ΔGs and is set to 10 or smaller. Of all the types of the surface effects, a higher density value is associated with a surface effect that applies a higher degree of gloss and a lower density value is associated with a surface effect that further suppresses gloss. The other surface effects, such as the watermark or the texture, are associated with density values in a middle range. As the watermark, a character or a background pattern may be used for example. The texture represents a character or a pattern and gives a tactual effect in addition to a visual effect. For example, a stained glass pattern can be realized with a clear toner. Premium Gloss or Gloss can be used as a substituted for the surface protection. A user designates, via the image processing application, an area to which a surface effect is to be applied in an image represented by image data being a processing object and a type of the surface effect to be applied. The host device 10 that executes the image processing application generates the gloss-control plane data by setting a density value corresponding to the surface effect designated by the user for each drawing object contained in the area specified by the user. A correspondence relation between the density value and the types of the surface effects will be described later.

FIG. 4 is a diagram illustrating an example of the gloss-control plane data. In the example of the gloss-control plane data illustrated in FIG. 4, a user designates "PG (specular gloss)" for a drawing object "ABC", designates "G (solid gloss)" for a drawing object "rectangle", and designates "M (halftone matte)" for a drawing object "circle". The density value set for each surface effect is determined in accordance with the type of the surface effect in a density value selection table (see FIG. 6) to be described later.

Figures 5, 6:
FIG. 5 is a diagram illustrating an example of clear plane data.
FIG. 6 is a diagram illustrating an example of a density value selection table.

The clear plane data is image data in which a transparent image, such as a watermark or a texture, other than the surface effects described above is designated. FIG. 5 is a diagram illustrating an example of the clear plane data. In the example in FIG. 5, a watermark "Sale" is designated by a user.

As described above, the gloss-control plane data and the clear plane data that are the special-color plane data are generated as plane data separate from the color plane data by the image processing application of the host device 10. A PDF (Portable Document Format) is used as a format of the color plane data, the gloss-control plane data, and the clear plane data. The document data is generated by integrating the pieces of the plane data in the PDF form. The data format of each plane data is not limited to PDF, and an arbitrary format may be used.

The image processing application of the host device 10 generates the gloss-control plane data by converting the type of a surface effect designated by a user into a density value. The conversion is performed with reference to the density value selection table stored in advance in a storage unit of the host device 10. The density value selection table is table data in which the types of the surface effects and density values of the gloss-control plane data corresponding to the respective surface effects are associated with one another. FIG. 6 is a diagram illustrating an example of the density value selection table. In the example in FIG. 6, the density value of the gloss-control plane data corresponding to an area where "PG" (specular gloss) is designated by a user is a pixel value corresponding to "98%"; the density value of the gloss-control plane data corresponding to an area where "G" (solid gloss) is designated is a pixel value corresponding to "90%"; the density value of the gloss-control plane data corresponding to the area where "M" (halftone matte) is designated is a pixel value corresponding to "16%"; and the density value of the gloss-control plane data corresponding to the area where "PM" (delustered) is designated is a pixel value corresponding to "6%".

The density value selection table is the same data as a surface-effect selection table (to be described later) stored in the DFE 50. A control unit of the host device 10 acquires the surface-effect selection table at a predetermined timing, generates the density value selection table based on (or by copying) the acquired surface-effect selection table, and stores the density value selection table in the storage unit. While the density value selection table is simplified in FIG. 6 by way of example, the actual density value selection table is the same as the surface-effect selection table illustrated in FIG. 11. The surface-effect selection table may be stored in a storage server (cloud) on a network, such as the Internet. In this case, the control unit may acquire the surface-effect selection table from the server and generates the density value selection table based on (or by copying) the acquired surface-effect selection table. In this case, however, the surface-effect selection table stored in the DFE 50 and the surface-effect selection table stored in the storage unit of the host device need to be the same data.

Figures 7, 8:
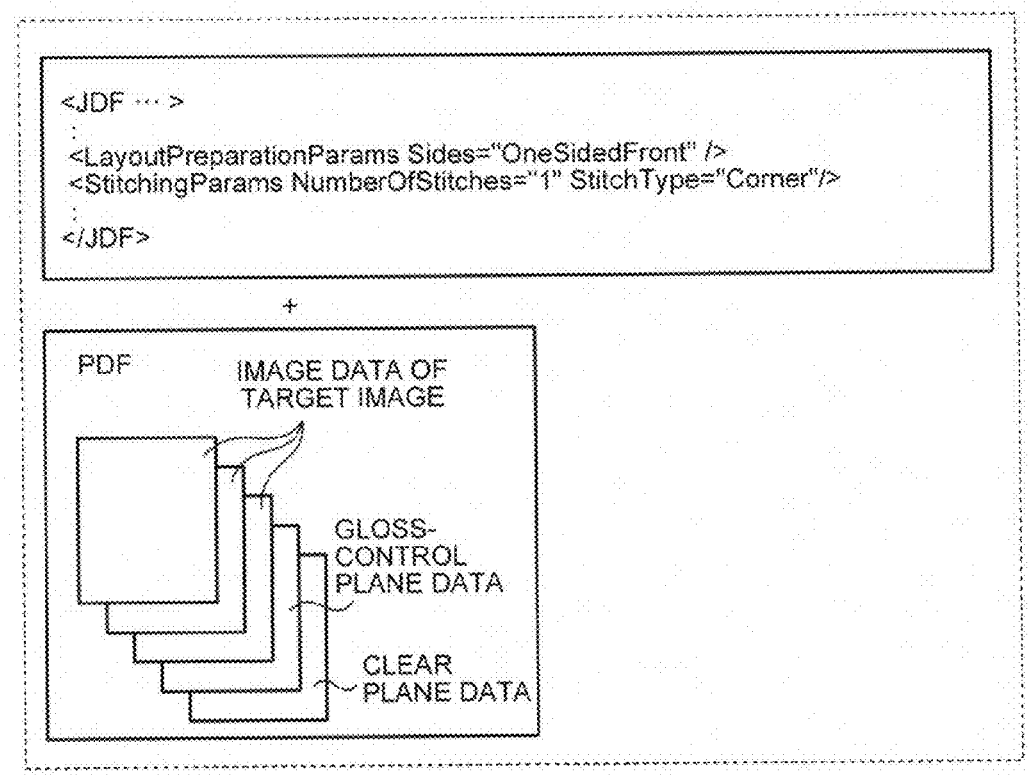
FIG. 7 is a diagram illustrating a correspondence relation of a drawing object, a coordinate, and a density value in the gloss-control plane data illustrated in FIG. 4.
FIG. 8 is a diagram schematically illustrating a configuration example of print data.

Specifically, the image processing application of the host device 10 generates the gloss-control plane data by setting a density value (gloss control value) of a drawing object, for which a user has designated a predetermined surface effect, to a value corresponding to the designated surface effect by referring to the density value selection table illustrated in FIG. 6. For example, it is assumed that a user designates "PG" for an area displaying "ABC", designates "G" for a rectangular area, and designates "M" for a circular area in a target image of the color plane data illustrated in FIG. 2. In this case, the host device 10 sets the density value of the drawing object ("ABC") for which "PG" is designated by the user to a pixel value corresponding to "98%", sets the density value of the drawing object ("rectangle") for which "G" is designated to a pixel value corresponding to "90%", and sets the density value of the drawing object ("circle") for which "M" is designated to a pixel value corresponding to "16%" by referring to the density value selection table, to thereby generate the gloss-control plane data. The gloss-control plane data generated by the host device 10 is data in the vector format, which is represented as a set of the coordinates of points, a parameter of an equation of a line or a plane connecting the points, and drawing objects indicating a fill and a special effect. FIG. 4 illustrates an image of the gloss-control plane data. FIG. 7 is a diagram illustrating a correspondence relation between the drawing object, the coordinate, and the density value in the gloss-control plane data illustrated in FIG. 4.

The host device 10 generates document data by integrating the gloss-control plane data, image data (color plane data) of a target image, and the clear plane data.

The host device 10 generates print data based on the document data. The print data contains the image data (color plane data) of the target image, the gloss-control plane data, the clear plane data, and a job command for designating settings, such as setting of a printer, setting of aggregation, or setting of duplex printing, in the printer. FIG. 8 is a diagram schematically illustrating a configuration example of the print data. In the example in FIG. 8, JDF (Job Definition Format) is used as the job command. However the job command is not limited to this example. The JDF illustrated in FIG. 8 is a command for designating "one-side printing and stapling" as the setting of aggregation. The print data may be converted into a page description language (PDL), such as PostScript, or may remain in the PDF if the DFE 50 can handle the PDF.

Figure 9:
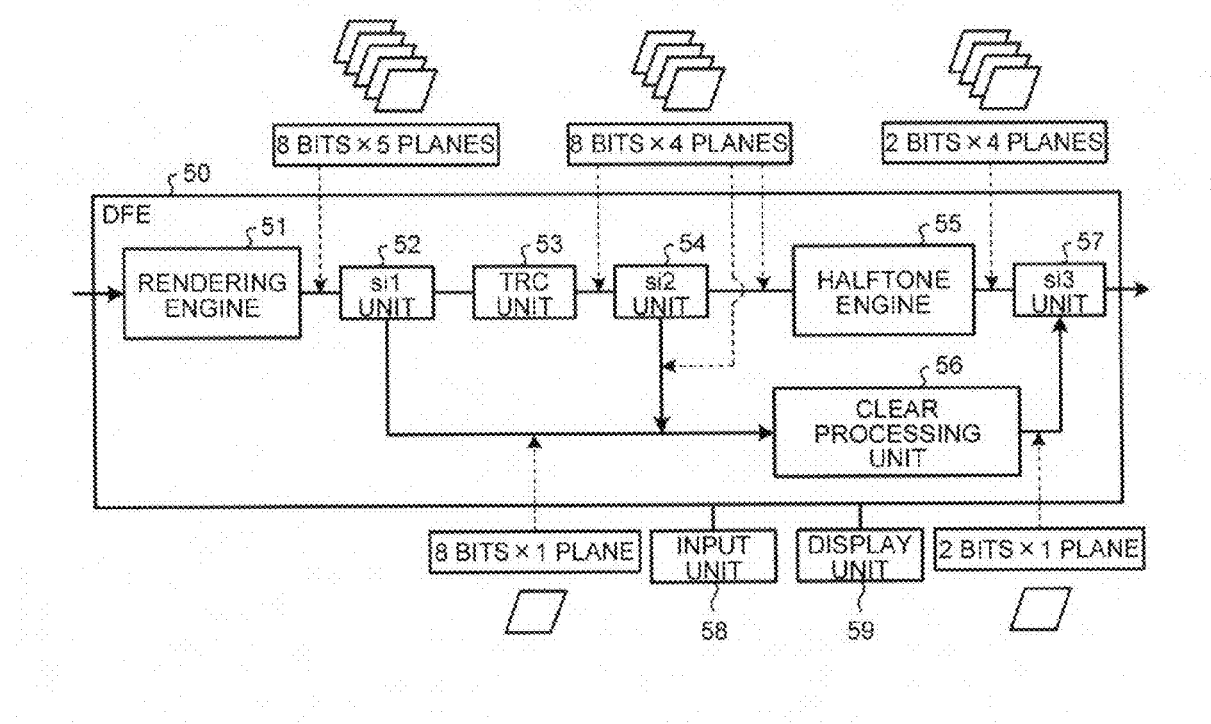
FIG. 9 is a diagram illustrating a functional configuration of a DFE.

A functional configuration of the DFE 50 will be explained below. As illustrated by example in FIG. 9, the DFE 50 includes a rendering engine 51, an si1 unit 52, a TRC (Tone Reproduction Curve) unit 53, an si2 unit 54, a halftone engine 55, a clear processing unit 56, an si3 unit 57, an input unit 58, and a display unit 59. The rendering engine 51, the si1 unit 52, the TRC unit 53, the si2 unit 54, the halftone engine 55, the clear processing unit 56, and the si3 unit 57 are realized by causing a control unit of the DEF 50 to execute various programs stored in a main storage unit or an auxiliary storage unit. Each of the si1 unit 52, the si2 unit 54, and the si3 unit 57 has a function to separate image data (separation) and a function to integrate image data (integration).

In the following, an example will be explained in which the print data is constructed of the color plane data and the gloss-control plane data without the clear plane data. However, the clear plane data may be contained in the print data.

The input unit 58 is an input device, such as a keyboard or a mouse. The display unit 59 is a display device, such as a display.

The rendering engine 51 receives print data (print data illustrated in FIG. 8) transmitted by the host device 10. The rendering engine 51 interprets the language of the input image data, converts the image data represented in the vector format into image data in a raster format, converts a color space based on the RGB color model into a color space based on the CMYK color model, and outputs CMYK 8-bit color plane data and 8-bit gloss-control plane data. The si1 unit 52 outputs the CMYK 8-bit color plane data to the TRC unit 53 and outputs the 8-bit gloss-control plane data to the clear processing unit 56. The DFE 50 converts the gloss-control plane data in the vector format output by the host device 10 into gloss-control plane data in the raster format. Therefore, the DFE 50 sets a type of a surface effect to be applied to a drawing object designated by a user via the image processing application as a density value for each pixel, and outputs the gloss-control plane data with the density values.

The TRC unit 53 receives CMYK 8-bit image data via the si1 unit 52. The TRC unit 53 performs gamma correction on the received image data by using a gamma curve of one-dimensional lookup table (1D_LUT) generated by calibration. Total amount control of toner may be performed as image processing, in addition to the gamma correction. The total amount control is a process for limiting the CMYK 8-bit color plane data after the gamma correction because the amount of toner that the printer 70 can adhere to one pixel on a recording medium is limited. If printing is performed beyond the total amount control, the image quality is reduced due to a transfer failure or a fixing failure. In the first embodiment, only related gamma correction will be explained.

The si2 unit 54 outputs the CMYK 8-bit color plane data subjected to the gamma correction by the TRC unit 53 to the clear processing unit 56 as data for generating an inverse mask (to be described later). The halftone engine 55 receives the CMYK 8-bit color plane data subjected to the gamma correction via the si2 unit 54. To output the input color plane data to the printer 70, the halftone engine 55 performs halftone processing for converting the received color plane data into image data in a certain data format, such as CMYK 2-bit color plane data, and outputs the CMYK 2-bit color plane data subjected to the halftone processing. The 2-bit data is described by way of example only, and the present invention is not limited to this example.

The clear processing unit 56 receives the 8-bit gloss-control plane data converted by the rendering engine 51 via the si1 unit 52, and receives the CMYK 8-bit color plane data subjected to the gamma correction by the TRC unit 53 via the si2 unit 54.

Figure 10:
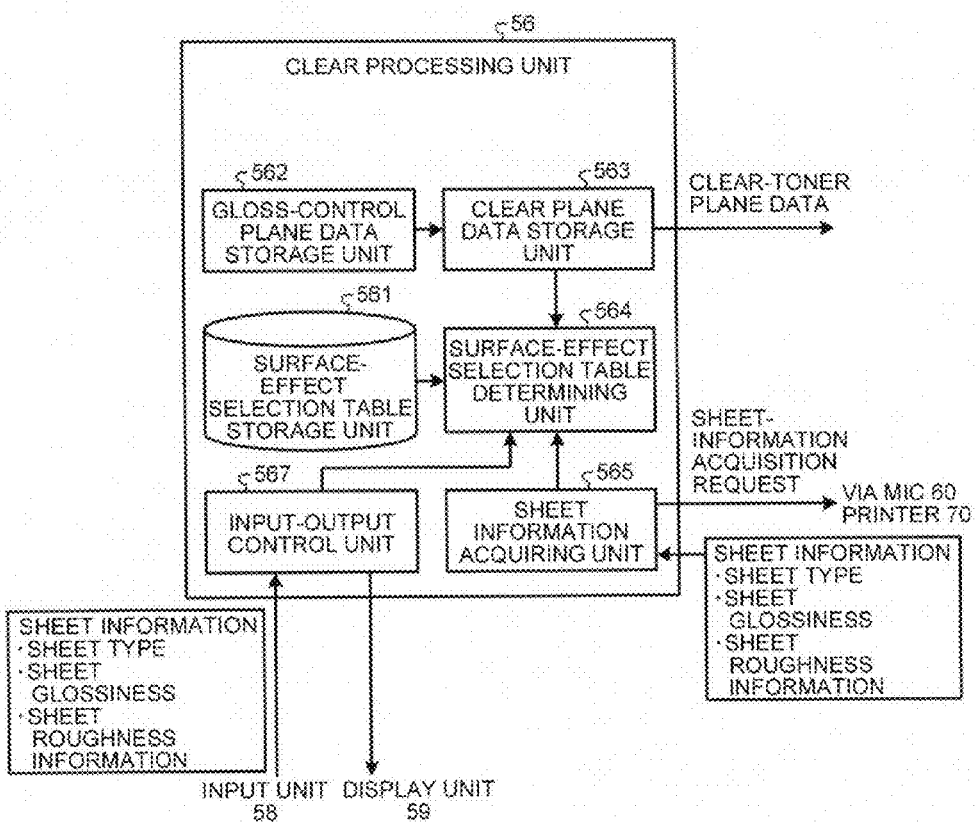
FIG. 10 is a diagram illustrating a functional configuration of a clear processing unit according to the first embodiment.

FIG. 10 is a block diagram illustrating a functional configuration of the clear processing unit 56. As illustrated in FIG. 10, the clear processing unit 56 mainly includes a surface-effect selection table storage unit 561, a gloss-control plane data storage unit 562, a surface-effect selection table determining unit 564, a clear-toner plane data generating unit 563, a sheet information acquiring unit 565, and an input-output control unit 567.

The surface-effect selection table storage unit 561 stores therein a surface-effect selection table for each sheet of paper, which will be described later. The gloss-control plane data storage unit 562 stores therein the 8-bit gloss-control plane data input by the si1 unit 52.

The clear-toner plane data generating unit 563 determines a surface effect corresponding to the density value (pixel value) of each pixel contained in the gloss-control plane data by referring to the surface-effect selection table (to be described later) by using the gloss-control plane data that is input by the si1 unit 52 and that is stored in the gloss-control plane data storage unit 562. The clear-toner plane data generating unit 563 determines on or off of the glosser 80 according to the determination of the surface effect, and appropriately generates an inverse mask or a solid mask by using the input CMYK 8-bit color plane data, to thereby appropriately generate 2-bit clear-toner plane data for attaching a clear toner. The clear-toner plane data generating unit 563 appropriately generates and outputs the clear-toner plane data used by the printer 70 and the clear-toner plane data used by the low-temperature fixing device 90 according to the determination result of the surface effect, and also outputs the on/off information indicating on or off of the glosser 80.

The inverse mask is used to equalize the total adhesion amount of CMYK toners and a clear toner on each pixel of a target area to which a surface effect is applied. Specifically, image data that is obtained by adding up the density values of all pixels of the target area of the CMYK plane data and by subtracting a predetermined value from the total amount of the density values is used as the inverse mask. For example, an inverse mask 1 to be described later is represented by Equation (1) below:

$$Clr=100-(C+M+Y+K) \qquad (1)$$

if Clr<0, Clr=0.

In Equation (1), Clr, C, M, Y, and K represent the density ratios converted from the respective density values of a clear toner and toners of C, M, Y, and K at each pixel. Specifically, by Equation (1), the total adhesion amount of toner obtained by adding the adhesion amount of the clear toner and the total adhesion amount of the toners of C, M, Y, and K is set to 100% at all of the pixels of the target area to which the surface effect is applied. If the total adhesion amount of the toners of C, M, Y, and K is 100% or greater, the clear toner is not attached and the density ratio of the clear toner is set to 0%. This is because a portion where the total adhesion amount of the toners of C, M, Y, and K exceeds 100% is smoothed by a fixing process. In this way, by setting the total adhesion amount to 100% at all of the pixels of the target area to which the surface effect is applied, it becomes possible to reduce surface irregularities due to a difference between the total adhesion amounts of toners in the target area. Therefore, it is possible to generate gloss by specular reflection of light. The inverse mask may be obtained by Equation other than Equation (1), and various types of inverse masks may be applicable.

For example, the inverse mask may be configured to uniformly attach a clear toner to each pixel. The inverse mask of this type is called a solid mask and is represented by Equation (2) below:

$$Clr=100 \qquad (2)$$

It may be possible to assign the density ratio other than 100% to any of target pixels to which the surface effect is applied. Therefore, solid masks of various patterns may be applicable.

For another example, the inverse mask may be obtained by multiplication of background color exposure rates of the respective colors. The inverse mask of this type is represented by, for example, Equation (3) below:

$$Clr=100\times\{(100-C)/100\}\times\{(100-M)/100\}\times \{(100-Y)/100\}\times\{(100-K)/100\} \quad (3)$$

In Equation (3), (100−C)/100 represents the background exposure rate of C, (100−M)/100 represents the background exposure rate of M, (100−Y)/100 represents the background exposure rate of Y, and (100−K)/100 represents the background exposure rate of K.

For still another example, the inverse mask may be obtained by a method based on the assumption that the halftone dot with the largest area ratio regulates the smoothness. The inverse mask of this type is represented by, for example, Equation (4):

$$Clr=100-\max(C,M,Y,K) \quad (4)$$

In Equation (4), max(C, M, Y, K) indicates that the density value of a color having the greatest density value among CMYK serves as a representative value.

Namely, the inverse mask represented by any of Equation (1) to Equation (4) is applicable.

The surface-effect selection table stored in the surface-effect selection table storage unit 561 will be explained below. The surface-effect selection table represents a correspondence relation between the density value serving as a gloss control value indicating a surface effect and a type of the surface effect, and a correspondence relation between control information on a post-processor based on the configuration of the information processing system, clear-toner plane data used by the printer 70, and clear-toner plane data used by the post-processor.

The configuration of the information processing system differs in various ways. In the first embodiment, the glosser 80 and the low-temperature fixing device 90 are connected, as the post-processors, to the printer 70. Therefore, the control information on the post-processor based on the configuration of the information processing system is the on/off information indicating on or off of the glosser 80. The clear-toner plane data used by the post-processor includes the clear-toner plane data used by the low-temperature fixing device 90.

In the first embodiment, the surface-effect selection table storage unit 561 stores therein a surface-effect selection table that differs for each sheet types. In the first embodiment, three sheet types are employed such as coated paper with high glossiness, plain paper with medium glossiness, and matte paper with low glossiness. Therefore, the surface-effect selection table storage unit 561 stores therein a surface-effect selection table for coated paper, a surface-effect selection table for plain paper, and a surface-effect selection table for matte paper.

FIG. 11 is a diagram illustrating an exemplary data structure of the surface-effect selection table for coated paper. FIG. 12 is a diagram illustrating an exemplary data structure of the surface-effect selection table for plain paper. FIG. 13 is a diagram illustrating an exemplary data structure of the surface-effect selection table for matte paper.

The surface-effect selection table may be configured to represent a correspondence relation of control information on the post-processor, first clear-toner plane data used by the printer 70, second clear-toner plane data used by the post-processor, a density value, and a type of a surface effect, for each image forming system having a different configuration. However, in FIG. 11 to FIG. 13, data structures corresponding to the configuration of the image forming system of the first embodiment are illustrated by way of example. In the correspondence relation between the type of the surface effect and the density value in FIG. 11 to FIG. 13, an individual type of a surface effect is associated with each range of the density values. Each of the types of the surface effect is associated with a percentage of the density (the density ratio) converted from a value (representative value) representing each of the ranges of the density values, for every 2% change in the density ratio. Specifically, the surface effect for applying gloss (the mirror-surface effect and the solid effect) is associated with a range of the density values ("212" to "255") with the density ratios of 84% or greater, and the surface effect for reducing gloss (Matte and Premium Matte) is associated with a range of the density values ("1" to "43") with the density ratios of 16% or smaller. A surface effect, such as a texture or a background watermark, is associated with a range of the density values with the density ratios of 20% to 80%.

A concrete example will be explained below with reference to the surface-effect selection table for coated paper illustrated in FIG. 11. For example, the specular gloss (PM: Premium Gloss) is associated, as the surface effect, with the pixel values of "238" to "255". Different types of Premium Gloss are associated with three respective ranges of the pixel values of "238" to "242", the pixel values of "243" to "247", and the pixel values of "248" to "255".

The solid gloss (G: Gloss) is associated with the pixel values of "212" to "232". Different types of Gloss are associated with four respective ranges of the pixel values of "212" to "216", the pixel values of "217" to "221", the pixel values of "222" to "227", and the pixel values of "228" to "232".

The halftone matte (M: Matte) is associated with the pixel values of "23" to "43". Different types of Mattee are associated with four respective ranges of the pixel values of "23" to "28", the pixel values of "29" to "33", the pixel values of "34" to "38", and the pixel values of "39" to "43". Premium Matte is associated with the pixel values of "1" to "17". Different types of Premium Matte are associated with tree respective ranges of the pixel values of "1" to "7", the pixel values of "8" to "12", and the pixel values of "13" to "17". The different types of the same surface effect are based on different equations that are applied to obtain the clear toner plane data used by the printer 70 or by the low-temperature fixing device 90, but the operations of a printer main-body or the post-processor are the same. No surface effect is associated with the density value of "0".

In FIG. 11, contents of the on/off information indicating on or off of the glosser 80, the first clear-toner plane data (Clr-1 in FIG. 1) used by the printer 70, and the second clear-toner plane data used by the low-temperature fixing device 90 are indicated in association with the pixel values and the surface effects. For example, when the surface effect is Premium Gloss, it is indicated that the glosser 80 is to be turned on, the first clear-toner plane data used by the printer 70 is an inverse mask, and there is no second clear-toner plane data (Clr-2 in FIG. 1) used by the low-temperature fixing device 90. The inverse mask is obtained by, for example, Equation (1) described above. In the example illustrated in FIG. 11, it is assumed that the mirror-surface effect is designated as the surface effect for the whole area defined by the image data. An example in which the mirror-surface effect is designated as the surface effect for a part of the area defined by the image data will be described later.

When the density value is in the range from "228" to "232" and the surface effect is Gloss, it is indicated that the glosser 80 is to be turned off, the first clear-toner plane data used by the printer 70 is the inverse mask 1, and there is no second clear-toner plane data used by the low-temperature fixing device 90.

Any inverse mask represented by one of Equation (1) to Equation (4) can be the inverse mask 1. This is because, because the glosser 80 is off, the total adhesion amount of toners to be smoothed varies and the surface roughness increases due to Premium Gloss. Therefore, Gloss with the lower glossiness than that of Premium Gloss can be obtained. When the surface effect is Matte, it is indicated that the glosser 80 is to be turned off, the first clear-toner plane data used by the printer 70 is halftone (halftone dot), and there is no second clear-toner plane data used by the low-temperature fixing device 90. When the surface effect is Premium Matte, it is indicated that the glosser 80 can be turned on or off, there is no first clear-toner plane data used by the printer 70, and the second clear-toner plane data used by the low-temperature fixing device 90 is a solid mask. The solid mask is obtained by, for example, Equation (2) described above.

In the surface-effect selection table for plain paper and the surface-effect selection table for matte paper respectively illustrated in FIG. 12 and FIG. 13, the types of Premium Gloss, the types of Gloss, the types of Matte, and the types of Premium Matte are different from those of the surface-effect selection table for coated paper according to the glossiness of each paper. For example, regarding the surface effect such as Premium Gloss or Gloss, the types are set such that the adhesion amount of a clear toner or a color toner is increased in a sheet with lower glossiness. Similarly, the types of the surface effects such as Matte and Premium Matte differ depending on the coated paper, the plain paper, and the matte paper.

More specifically, a specular gloss type "A" is registered for the density "98%", "B" is registered for the density "96%", and "C" is registered for the density "94%" in the surface-effect selection table for coated paper (see FIG. 11), while Premium Gloss type "A" is registered for the density "98%" and the density "96%" and "B" is registered for the density "94%" in the surface-effect selection table for plain paper that has lower glossiness than the coated paper as illustrated in FIG. 12. Here, it is assumed that the glossiness is higher in order of "A", "B", and "C". As illustrated in FIG. 11 to FIG. 13, the inverse mask serving as the first clear-toner plane data used by the printer 70 differs according to the differences in Premium Gloss types A, B, and C. Therefore, for the plain paper having lower glossiness than the coated paper, a specular gloss type with higher glossiness is set for the same density as compared with the coated paper.

In the surface-effect selection table for matte paper having much lower glossiness, as illustrated in FIG. 13, Premium Gloss type "A" with the highest glossiness is registered for all of the densities "98%", "96%", and "94%".

Similarly, in the case of Gloss, a solid gloss type "1" is registered for the density "90%", "2" is registered for the density "88%", "3" is registered for the density "86%", and "4" is registered for the density "84%" in the surface-effect selection table for coated paper (see FIG. 11), while Gloss type "1" is registered for the density "90%" and the density "88%", "2" is registered for the density "86%", and "3" is registered for the density "84%" in the surface-effect selection table for plain paper having lower glossiness than the coated paper as illustrated in FIG. 12. Here, it is assumed that the glossiness is higher in order of the types "1", "2", "3", and "4". As illustrated in FIG. 11 to FIG. 13, the inverse mask serving as the first clear-toner plane data used by the printer 70 differs according to the differences in Gloss types 1, 2, 3, and 4.

In the surface-effect selection table for matte paper having much lower glossiness, as illustrated in FIG. 13, a solid gloss type "1" with the highest glossiness is registered for all of the densities "90%", "88%", "86%", and "84%".

Referring back to FIG. 10, the sheet information acquiring unit 565 acquires sheet information on a sheet of paper that is a printing object of the printer 70 from the printer 70 via the MIC 60, and outputs the acquired sheet information to the surface-effect selection table determining unit 564. The sheet information contains a sheet type, sheet glossiness, and sheet roughness information.

The sheet type indicates one of "coated paper", "plain paper", and "matte paper" as described above. The glossiness is higher in order of the coated paper, the plain paper, and the matte paper. The sheet types are described by way of example, and not limited to "coated paper", "plain paper", and "matte paper". As the sheet glossiness, any of "high gloss", "medium gloss", "low gloss" is designated. The sheet roughness information indicates the smoothness, and "rough" or "fine" is designated.

Figures 14, 15:
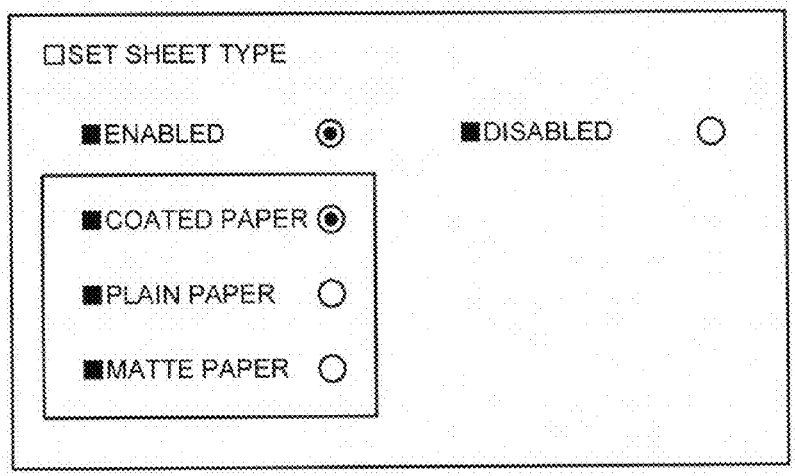
FIG. 14 is a diagram illustrating correlation of a sheet type, sheet glossiness, and sheet roughness information.
FIG. 15 is a diagram illustrating an example of a sheet type setting screen.

The sheet type, the sheet glossiness, and the sheet roughness information are co-related to one another. FIG. 14 is a diagram illustrating a correlation of the sheet type, the sheet glossiness, and the sheet roughness information. As illustrated in FIG. 14, a sheet of the sheet type of "coated paper" has the glossiness of "high gloss" and the roughness information (smoothness) of "fine". A sheet of the sheet type of "plain paper" has the glossiness of "medium gloss" and no roughness information (smoothness). A sheet of the sheet type of "matte paper" has the glossiness of "low gloss" and the roughness information (smoothness) of "rough".

Therefore, if the glossiness and the smoothness are specified, the sheet type can be obtained based on the correlation illustrated in FIG. 14.

Referring back to FIG. 10, the input-output control unit 567 controls display of various screens on the display unit 59 and input of various designations from the input unit 58. In the first embodiment, the input-output control unit 567 causes the display unit 59 to display a sheet type setting screen, a glossiness setting screen, and a smoothness setting screen. The input-output control unit 567 inputs designation of a sheet type via the sheet type setting screen displayed on the display unit 59, designation of glossiness via the glossiness setting screen displayed on the display unit 59, and designation of smoothness (the roughness information) via the smoothness setting screen displayed on the display unit 59. The input-output control unit 567 outputs, as user-designated sheet information, the sheet type, the sheet glossiness, and the sheet roughness information as the smoothness input by a user to the surface-effect selection table determining unit 564.

FIG. 15 is a diagram illustrating an example of the sheet type setting screen. As illustrated in FIG. 15, the sheet type setting screen displays radio buttons for designating whether user setting of the sheet type is enabled or disabled. When a radio button of "enabled" is selected, a user can designate a sheet type from among "coated paper", "plain paper", and "matte paper" by using a radio button. The designated sheet type is notified to the input-output control unit 567 as an input event.

Figure 16:
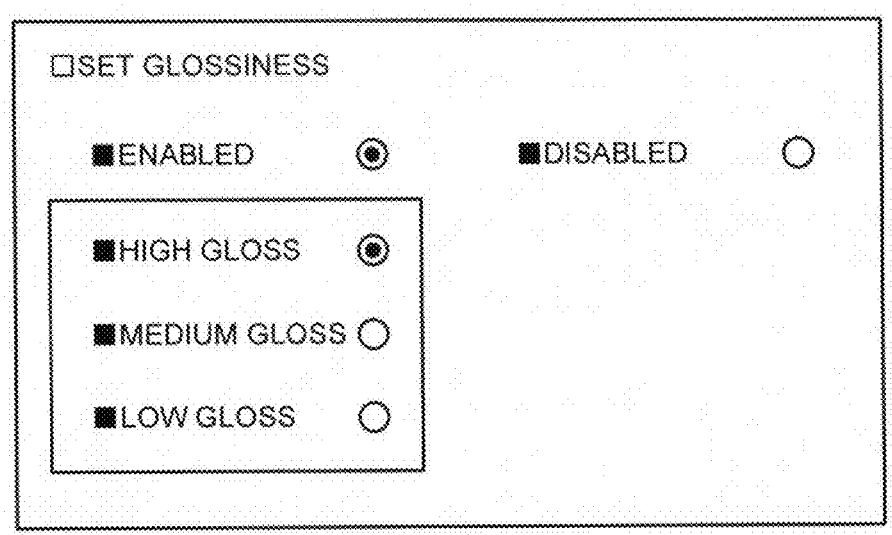
FIG. 16 is a diagram illustrating an example of a glossiness setting screen.

FIG. 16 is a diagram illustrating an example of the glossiness setting screen. As illustrated in FIG. 16, the glossiness setting screen displays radio buttons for designating whether user setting of the glossiness is enabled or disabled. When a radio button of "enabled" is selected, a user can designate glossiness from among "high gloss", "medium gloss", and "low gloss" by using a radio button. The designated glossiness is notified to the input-output control unit 567 as an input event.

Figure 17:
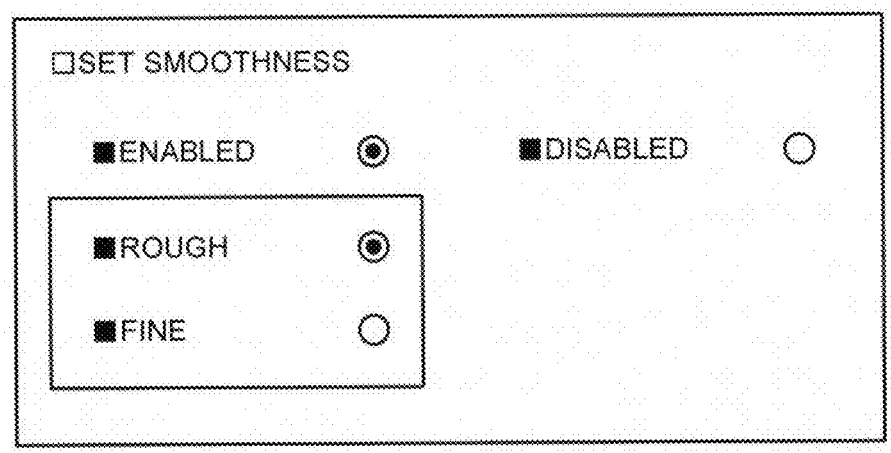
FIG. 17 is a diagram illustrating an example of a smoothness setting screen.

FIG. 17 is a diagram illustrating an example of the smoothness setting screen. As illustrated in FIG. 17, the smoothness setting screen displays radio buttons for designating whether user setting of the smoothness is enabled or disabled. When a radio button of "enabled" is selected, a user can designate smoothness from "rough", and "fine" by using a radio button. The designated smoothness as the sheet roughness information is notified to the input-output control unit 567 as an input event.

Figure 18:
FIG. 18 is a diagram illustrating an example of a sheet information registration screen.

The input-output control unit 567 also causes the display unit 59 to display a sheet information registration screen for allowing a user to designate elements that serve as the sheet information and a priority order of the elements. FIG. 18 is a diagram illustrating an example of the sheet information registration screen.

As illustrated in FIG. 18, the sheet information registration screen contains two element list sections of an "unregistration list" and a "registration list". The "unregistration list" displays a list of elements that are selectable as the sheet information as elements used to determine the surface-effect selection table. The "registration list" displays a list of elements that have been selected as the sheet information as elements used to determine the surface-effect selection table.

Each of the elements of the sheet information in each of the lists can be moved between the two lists by first selecting a subject by pressing a screen and thereafter pressing a side (horizontal) arrow. A display order of the elements of the sheet information in the "registration list" can be changed by first selecting a subject by pressing the screen and thereafter pressing an up-down (vertical) arrow. The priority is given to the elements, as the elements used to determine the surface-effect selection table, in descending order from the top.

When a user registers a new element used to determine the surface-effect selection table, the user presses a "new registration" button on the screen and selects a new element to be registered.

Referring back to FIG. 10, the surface-effect selection table determining unit 564 selects, from the surface-effect selection table storage unit 561, a surface-effect selection table corresponding to the sheet type contained in the sheet information acquired by the sheet information acquiring unit 565 or the sheet type contained in user-designated sheet information output by the input-output control unit 567, so that the surface-effect selection table used to generate clear-toner plane data is selected.

Specifically, when the sheet information is designated by the user, the surface-effect selection table determining unit 564 selects a surface-effect selection table by using the user-designated sheet information. On the other hand, when the sheet information is not designated by the user, the sheet information acquiring unit 565 transmits a sheet information acquisition request to the printer 70 via the MIC 60, and receives sheet information transmitted by the printer 70 in response to the request. The surface-effect selection table determining unit 564 selects a surface-effect selection table by using the sheet information received by the sheet information acquiring unit 565.

Whether or not the sheet information is designated by the user is determined by determining whether or not the user-designated sheet information is output by the input-output control unit 567. Alternatively, it may be possible to cause the input-output control unit 567 to temporarily store the sheet information designated by the user in a memory (not illustrated), such as a random access memory (RAM), and cause the surface-effect selection table determining unit 564 to determine whether the user-designated sheet information is stored in the RAM in order to determine whether the sheet information is designated by the user.

When transmitting the sheet information acquisition request to the printer 70 via the MIC 60, the sheet information acquiring unit 565 requests the printer 70 to transmit a highest-priority element of the sheet information designated by the user via the sheet information registration screen, and receives the highest-priority element of the sheet information.

When the sheet information contains a sheet type, the surface-effect selection table determining unit 564 selects a surface-effect selection table corresponding to the sheet type. On the other hand, when the sheet information does not contain the sheet type, the surface-effect selection table determining unit 564 determines a sheet type associated with the sheet glossiness or the sheet roughness information contained in the sheet information according to the correlation illustrated in FIG. 14, and selects a surface-effect selection table corresponding to the sheet type.

When the sheet information contains all of the sheet type, the sheet glossiness, and the sheet roughness information, the surface-effect selection table determining unit 564 selects a corresponding surface-effect selection table by using the highest-priority element among the three elements. In particular, the surface-effect selection table determining unit 564 uses the sheet type as it is when the sheet type is the highest-priority element. When the sheet glossiness or the sheet roughness information is the highest-priority element, the surface-effect selection table determining unit 564 selects a surface-effect selection table corresponding to the sheet type associated with the highest-priority element.

When the sheet information contains any two of the sheet type, the sheet glossiness, and the sheet roughness information, the surface-effect selection table determining unit 564 selects a corresponding surface-effect selection table by using a higher-priority element between the two elements.

The clear-toner plane data generating unit 563 of the clear processing unit 56 determines a surface effect associated with each pixel value of the gloss-control plane data by referring to the surface-effect selection table selected by the surface-effect selection table determining unit 564 as described above, and also determines on or off of the glosser 80 and clear-toner plane data to be used by each of the printer 70 and the low-temperature fixing device 90. The clear-toner plane data generating unit 563 determines on or off of the glosser 80 for each page. Subsequently, as described above, the clear-toner plane data generating unit 563 appropriately generates and outputs the clear-toner plane data according to the determination result, and outputs the on/off information on the glosser 80. Therefore, the clear-toner plane data with the gloss effect desired by the user is generated according to the sheet type.

The si3 unit 57 integrates the CMYK 2-bit image data subjected to the halftone processing and the 2-bit clear-toner plane data generated by the clear processing unit 56, and outputs the integrated image data to the MIC 60. In some cases, the clear processing unit 56 may not generate at least one of the clear-toner plane data used by the printer 70 and the clear-toner plane data used by the low-temperature fixing device 90. Therefore, when the si3 unit 57 integrates the clear-toner plane data generated by the clear processing unit 56 and the clear processing unit 56 does not generate both pieces of the clear-toner plane data, the si3 unit 57 outputs the image data in which the CMYK 2-bit image data is integrated. Therefore, the DFE 50 outputs four to six pieces of 2-bit image data to the MIC 60. The si3 unit 57 also output the on/off information on the glosser 80, which is output by the clear processing unit 56, to the MIC 60.

The MIC 60 is connected to the DFE 50 and the printer 70. The MIC 60 outputs device configuration information indicating the configuration of a device installed as a post-processor to the DFE 50. The MIC 60 receives the color plane data and the clear-toner plane data from the DFE 50, allocates each piece of the image data to a corresponding device, and controls the post-processor. Specifically, as illustrated by example in FIG. 19, the MIC 60 outputs the CMYK color plane data among the pieces of the image data output by the DFE 50 to the printer 70. When there is clear-toner plane data used by the printer 70, the MIC 60 outputs the clear-toner plane data to the printer 70, and turns on or off the glosser 80 according to the on/off information output by the DFE 50. When there is clear-toner plane data used by the low-temperature fixing device 90, the MIC 60 outputs the clear-toner plane data to the low-temperature fixing device 90. The glosser 80 may switch between a pathway in which fixing is performed and a pathway in which fixing is not performed, based on the on/off information. The low-temperature fixing device 90 may switch between on and off based on presence or absence of the clear-toner plane data or may switch between the pathways similarly to the glosser 80.

Figure 19:
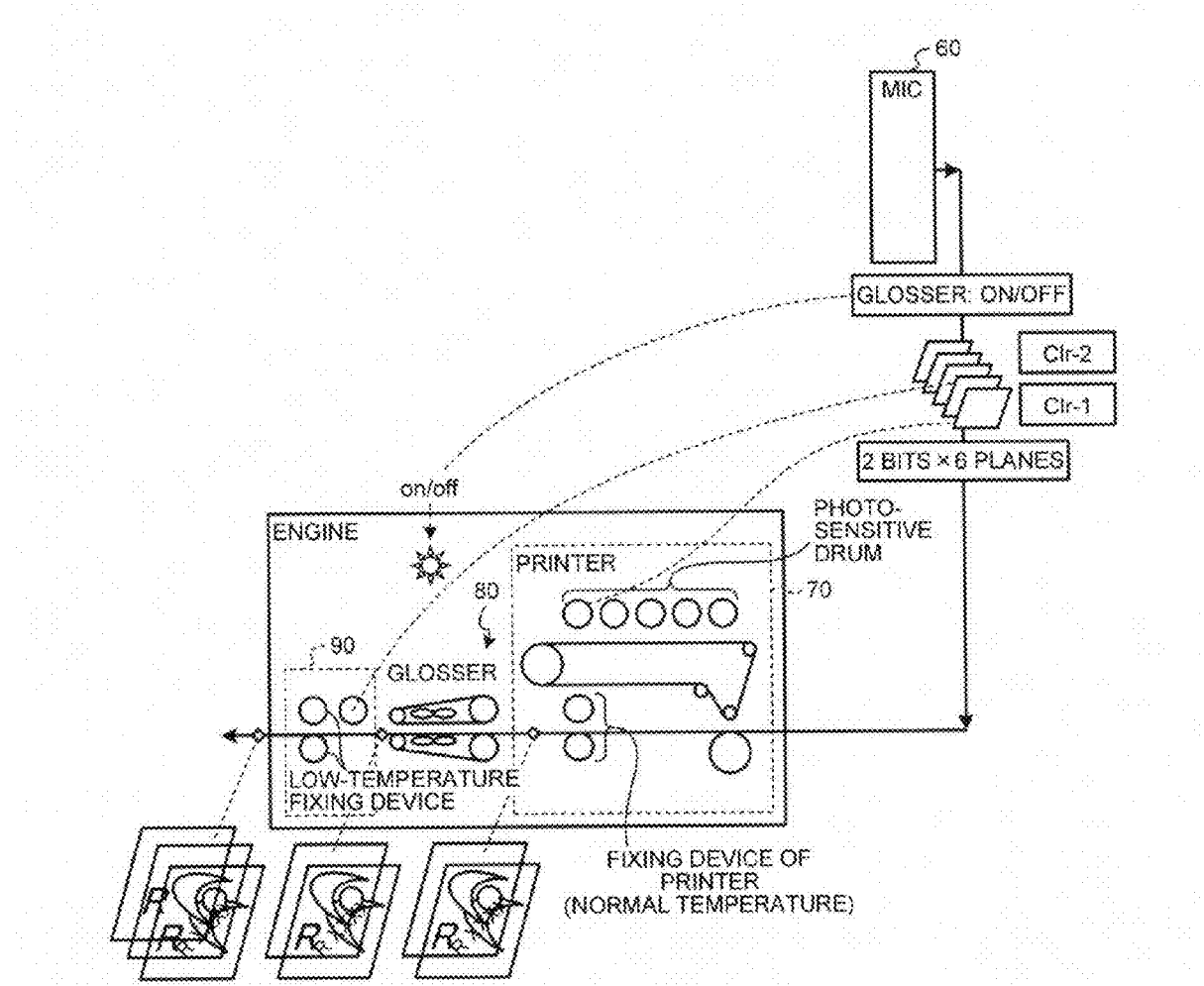
FIG. 19 is a diagram schematically illustrating a configuration example of an MIC and a printing apparatus.

As illustrated in FIG. 19, the printing apparatus 30 including the printer 70, the glosser 80, and the low-temperature fixing device 90 further includes a conveying path for conveying a recording medium. Specifically, the printer 70 includes a plurality of photosensitive drums of an electrophotographic system, a transfer belt on which toner images formed on the photosensitive drums are transferred, a transfer device that transfers the toner images on the transfer belt onto a recording medium, and a fixing device that fixes the toner images, which are transferred onto the recording medium, to the recording medium. The recording medium is conveyed along the conveying path by a conveying member (not illustrated) so as to be conveyed through, in the written order, positions where the printer 70, the glosser 80, and the low-temperature fixing device 90 are provided. After an image is formed on the recording medium and surface effects are applied to the recording medium through the processes by these devices, the recording medium is conveyed along the conveying path by a conveying mechanism (not illustrated) and discharged to the outside of the printing apparatus.

Therefore, when the image data output by the DFE 50 contains the CMYK color plane data and the clear-toner plane data, a color image specified by the color plane data is formed on the recording medium with a color toner, a surface effect of a type specified by the clear-toner plane data is applied to the recording medium with a clear toner, and a transparent image specified by the clear-toner plane data is formed on the recording medium with the clear toner. Namely, the surface effect based on the clear-toner plane data with the gloss effect desired by a user is applied to the recording medium according to the sheet type.

Figure 20:
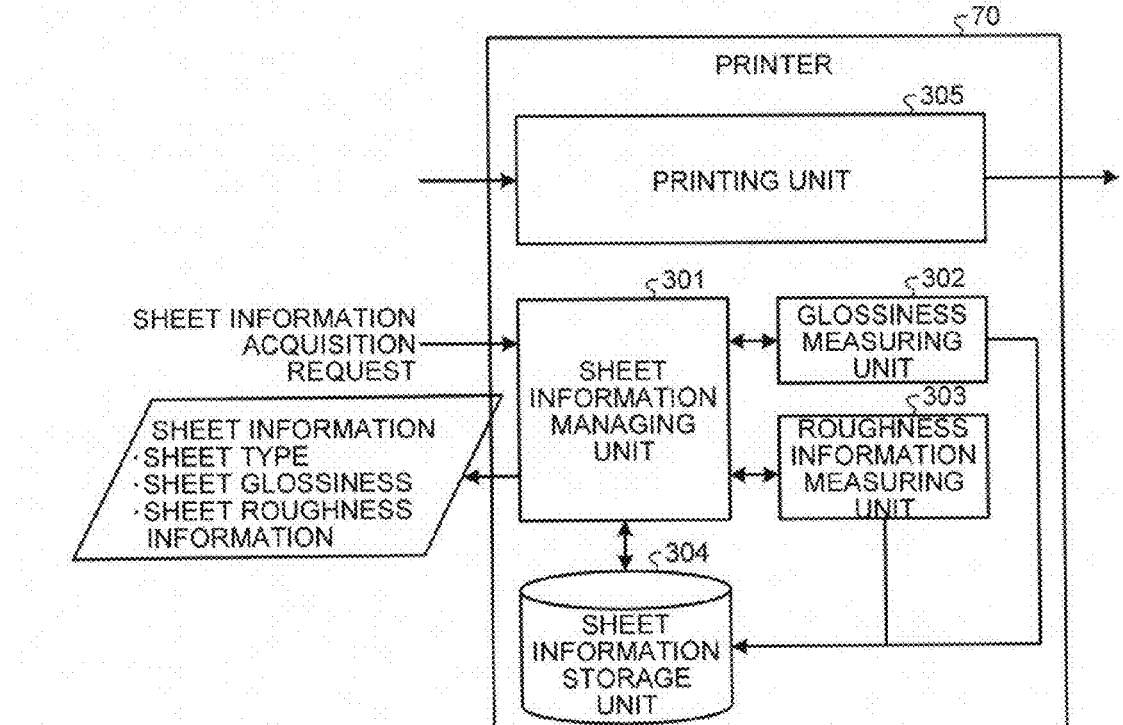
FIG. 20 is a block diagram illustrating a functional configuration of a printer.

A functional configuration of the printer 70 will be explained below. FIG. 20 is a block diagram illustrating a functional configuration of the printer 70 according to the first embodiment. As illustrated in FIG. 20, the printer 70 according to the first embodiment mainly includes a sheet information managing unit 301, a glossiness measuring unit 302, a roughness information measuring unit 303, a sheet information storage unit 304, and a printing unit 305.

The printing unit 305 is an engine for printing image data on a sheet of paper.

The sheet information storage unit 304 stores therein a sheet type of a sheet being a current printing object. The sheet information storage unit 304 also stores therein sheet glossiness measured by the glossiness measuring unit 302 and sheet roughness information (smoothness) measured by the roughness information measuring unit 303. The sheet type, the sheet glossiness, and the sheet roughness information serve as the sheet information. The sheet information storage unit 304 is a storage medium, such as a hard disk drive (HDD) or a memory.

The glossiness measuring unit 302 measures glossiness of a sheet housed in a tray or the like in response to a measurement instruction issued by the sheet information managing unit 301, and stores the measured glossiness in the sheet information storage unit 304. The roughness information measuring unit 303 measures smoothness of the sheet housed in the tray or the like in response to a measurement instruction issued by the sheet information managing unit 301, and stores the measured smoothness, as the sheet roughness information, in the sheet information storage unit 304. A well-known method is used to measure the sheet glossiness and the smoothness.

The sheet information managing unit 301 manages the sheet information stored in the sheet information storage unit 304. Specifically, when the sheet information acquisition request is received from the DFE 50 via the MIC 60 and if a sheet type is requested by the acquisition request, the sheet information managing unit 301 transmits, as the sheet information, the sheet type of a current printing object stored in the sheet information storage unit 304 to the DFE 50 via the MIC 60.

When the sheet glossiness is requested by the acquisition request, the sheet information managing unit 301 issues an instruction to measure the sheet glossiness to the glossiness measuring unit 302, and transmits, as the sheet information, the sheet glossiness accordingly stored in the sheet information storage unit 304 to the DFE 50 via the MIC 60. When the sheet roughness information is requested by the acquisition request, the sheet information managing unit 301 issues an instruction to measure the sheet smoothness to the roughness information measuring unit 303, and transmits, as the sheet information, the sheet roughness information accordingly stored in the sheet information storage unit 304 to the DFE 50 via the MIC 60.

Figure 21:
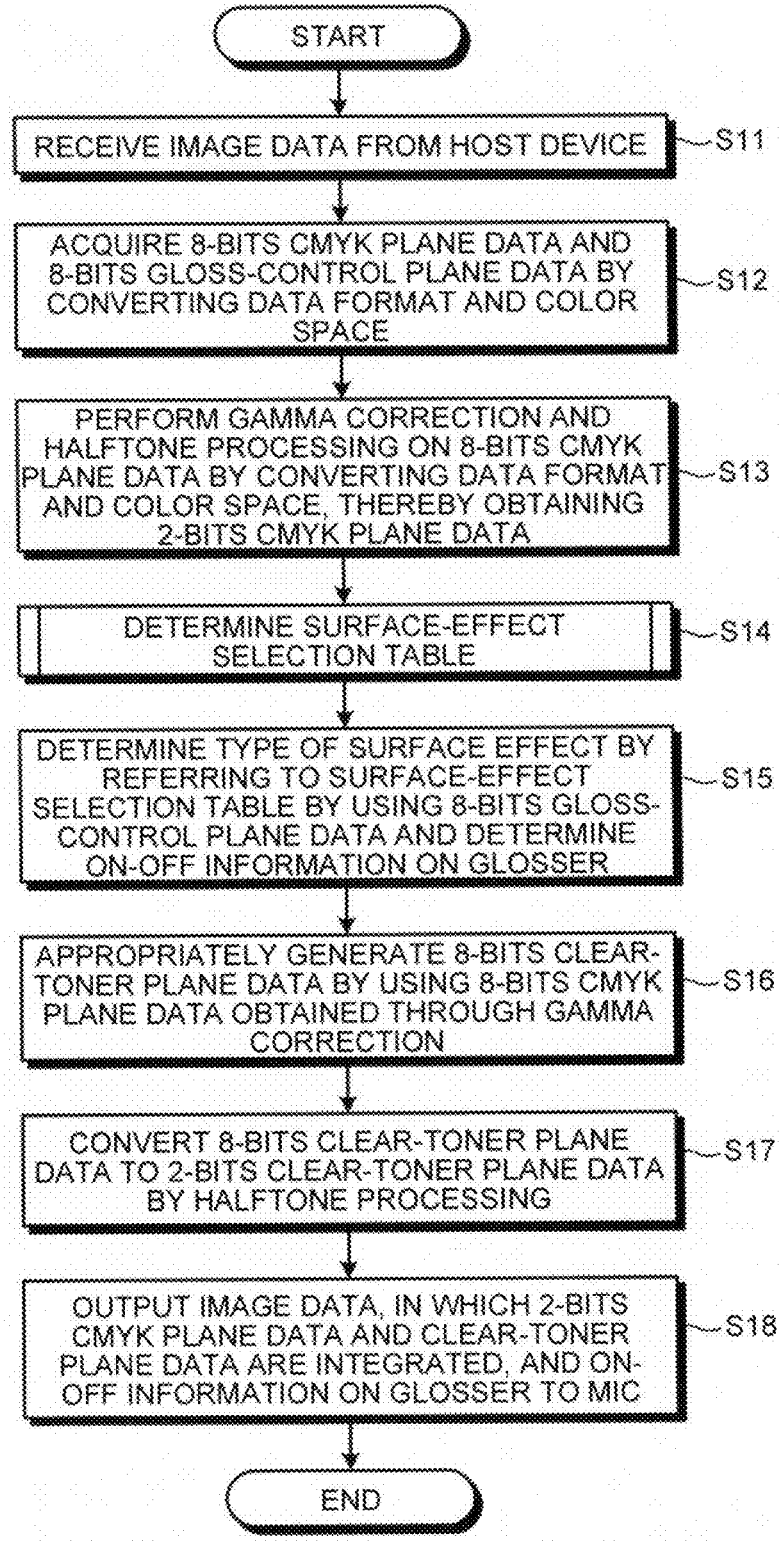
FIG. 21 is a flowchart illustrating the flow of a gloss control process performed by the image forming system according to the first embodiment.

The flow of a gloss control process performed by the image forming system according to the first embodiment will be explained below with reference to FIG. 21. When the DFE 50 receives print data (image data) from the host device 10 (Step S11), the rendering engine 51 interprets the language of the image data, converts the image data represented in the vector format to image data in the raster format, and converts a color space based on the RGB color model into a color space based on the CMYK color model, so that CMYK 8-bit color plane data and 8-bit gloss-control plane data are obtained (Step S12).

In the process of converting the gloss-control plane data, the gloss-control plane data as illustrated in FIG. 4, i.e., the gloss-control plane data in which the density value for identifying the surface effect is designated for each drawing object as illustrated in FIG. 7, is converted to the gloss-control plane data in which the density value is designated for each pixel of each drawing object.

Specifically, the rendering engine 51 assigns a density value, which is set for a drawing object, to pixels in a range of the coordinates corresponding to the drawing object of the gloss-control plane data illustrated in FIG. 7, to thereby convert the gloss-control plane data. Therefore, the gloss-control plane data is converted to gloss-control plane data in which the surface effect is set for each pixel.

Subsequently, when the 8-bit gloss-control plane data is output, the TRC unit 53 of the DFE 50 performs gamma correction on the CMYK 8-bit color plane data by using a 1D_LUT-based gamma curve generated by calibration, and outputs the CMYK 8-bit color plane data subjected to the gamma correction to the halftone engine 55 and the clear processing unit 56 via the si2 unit 54. The halftone engine 55 performs halftone processing on the image data subjected to the gamma correction in order to convert the image data to image data in a data format of CMYK 2-bit color plane data to be output to the printer 70, so that the CMYK 2-bit color plane data is obtained through the halftone processing (Step S13).

In the clear processing unit 56 of the DFE 50, the surface-effect selection table determining unit 564 performs a process for selecting and determining a surface-effect selection table from the surface-effect selection table storage unit 561 based on the sheet information (Step S14). The surface-effect selection table determination process will be explained in detail later.

The clear-toner plane data generating unit 563 of the clear processing unit 56 determines a surface effect designated for each pixel value of the gloss-control plane data by referring to the surface-effect selection table corresponding to the sheet type selected at Step S14 based on the 8-bit gloss-control plane data. The clear-toner plane data generating unit 563 performs the determination on all of the pixels contained in the gloss-control plane data. In the gloss-control plane data, the same range of density values are basically represented at all pixels in an area to which each of the surface effects is applied. Therefore, the clear-toner plane data generating unit 563 determines that a neighboring pixel determined as having the same surface effect is contained in an area to which the same surface effect is to be applied. In this way, the clear-toner plane data generating unit 563 of the clear processing unit 56 determines an area to which a surface effect is applied and a type of the surface effect applied to the area. The clear-toner plane data generating unit 563 determines on or off of the glosser 80 according to the above determination (Step S15).

The clear-toner plane data generating unit 563 appropriately generates 8-bit clear-toner plane data for attaching a clear toner by appropriately using the gamma-corrected CMYK 8-bit color plane data output by the si2 unit 54 (Step S16). The halftone engine 55 performs halftone processing to convert the 8-bit clear-toner plane data based on 8-bit image data to 2-bit clear-toner plane data (Step S17).

The Si3 unit 57 of the DFE 50 integrates the CMYK 2-bit color plane data obtained by the halftone processing at Step S13 and the 2-bit clear-toner plane data generated at Step S17, and outputs the integrated image data and the on/off information indicating on or off of the glosser 80 determined at Step S15 to the MIC 60 (Step S18).

When the clear-toner plane data generating unit 563 does not generate the clear-toner plane data at Step S16, only the CMYK 2-bit color plane data obtained by the halftone processing at Step S13 is integrated and output to the MIC 60 at Step S18.

Figure 22:
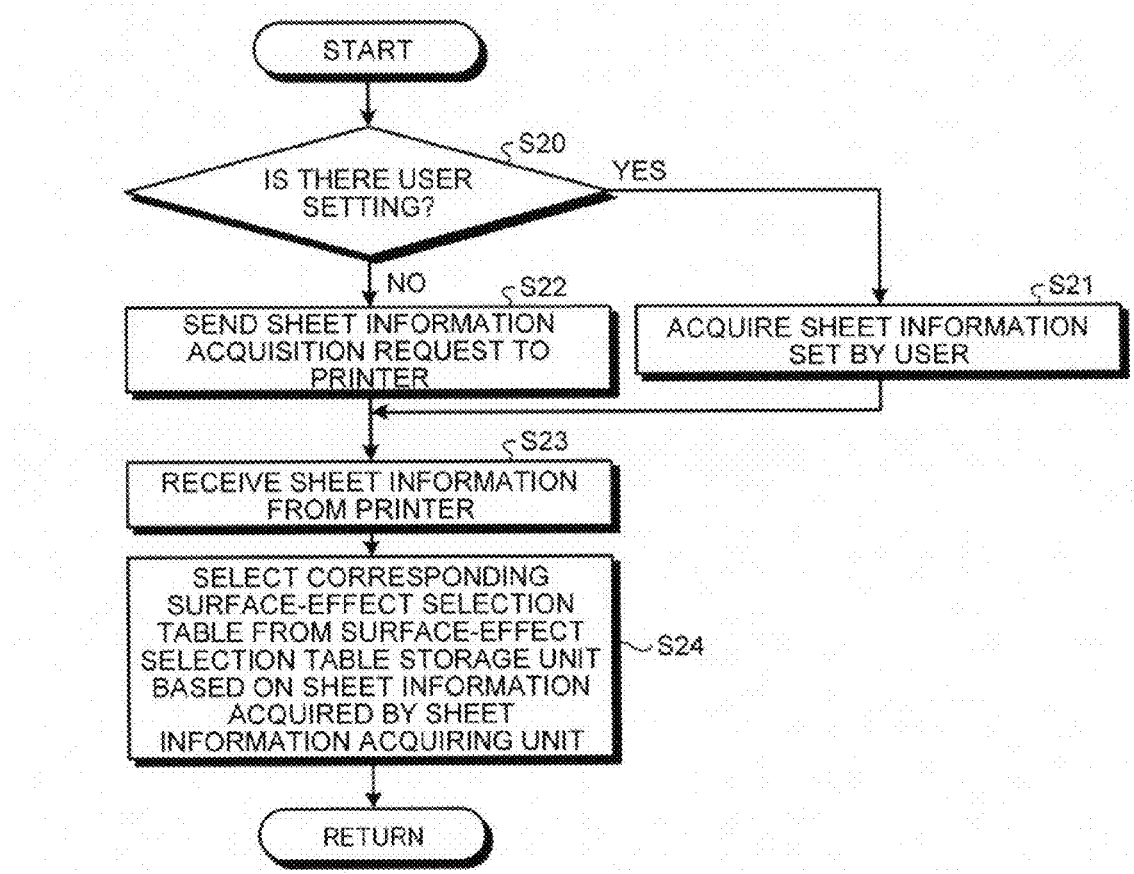
FIG. 22 is a flowchart illustrating the flow of a surface-effect selection table selection process according to the first embodiment.

The process for determining a surface-effect selection table at Step S14 will be explained in detail below. FIG. 22 is a flowchart illustrating the flow of the surface-effect selection table determination process.

The surface-effect selection table determining unit 564 determines whether sheet information is set by a user (Step S20).

When the sheet information is set by the user (YES at Step S20), the surface-effect selection table determining unit 564 acquires the sheet information set by the user from the input-output control unit 567 or a RAM etc. (Step S21).

On the other hand, when the sheet information is not set by the user at Step S20 (NO at Step S20), the sheet information acquiring unit 565 transmits a sheet information acquisition request to the printer 70 via the MIC 60 (Step S22), and receives the sheet information (Step S23). The sheet information acquiring unit 565 issues a request to acquire a highest-priority element from among the elements such as the sheet type, the sheet glossiness, and the sheet roughness information set by the user.

The surface-effect selection table determining unit 564 selects a surface-effect selection table from the surface-effect selection table storage unit 561 based on the acquired sheet information (Step S24). Specifically, as described above, the surface-effect selection table determining unit 564 identifies the sheet type contained in the acquired sheet information or the sheet type associated with the glossiness or the roughness information contained in the acquired sheet information, and selects a surface-effect selection table corresponding to the identified sheet type.

Figure 23:
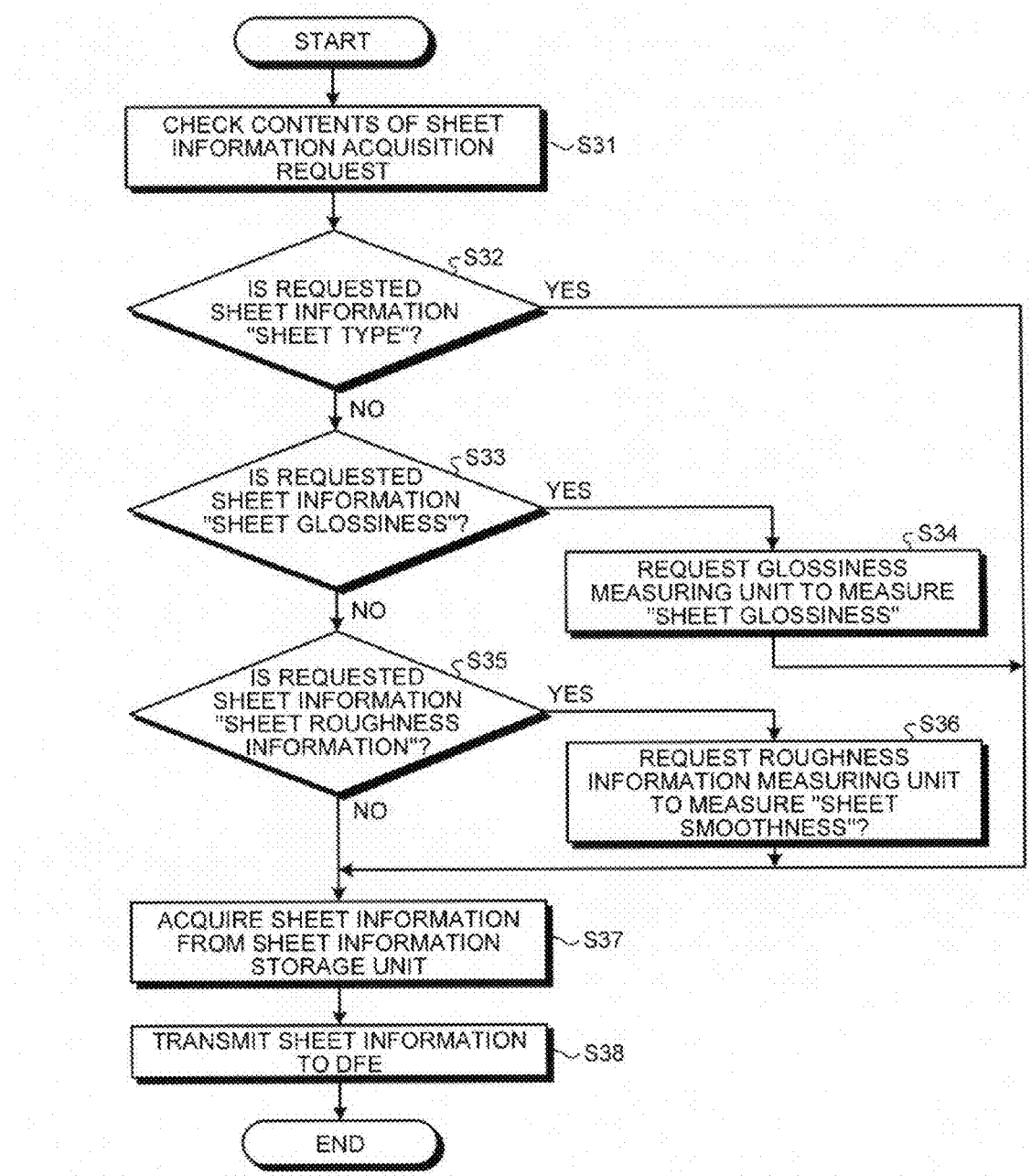
FIG. 23 is a flowchart illustrating the flow of a sheet information acquisition process according to the first embodiment.

A sheet information acquisition process performed by the printer 70 that has received the sheet information acquisition request at Step S22 will be explained below. FIG. 23 is a flowchart illustrating the flow of the sheet information acquisition process performed by the printer 70.

When receiving the sheet information acquisition request from the DFE 50, the sheet information managing unit 301 checks contents of the received sheet information acquisition request (Step S31). The sheet information managing unit 301 determines whether sheet information requested by the acquisition request is a sheet type (Step S32). When the requested sheet information is the sheet type (YES at Step S32), the sheet information managing unit 301 determines that a current sheet type stored in the sheet information storage unit 304 is to be used.

On the other hand, when the requested sheet information is not the sheet type at Step S32 (NO at Step S32), the sheet information managing unit 301 determines whether the sheet information requested by the acquisition request is sheet glossiness (Step S33). When the requested sheet information is the sheet glossiness (YES at Step S33), the sheet information managing unit 301 requests the glossiness measuring unit 302 to measure glossiness (Step S34). Accordingly, the glossiness measuring unit 302 measures the glossiness of a sheet being a printing object placed on a tray, and stores the measured glossiness in the sheet information storage unit 304.

On the other hand, when the requested sheet information is not the sheet glossiness at Step S33 (NO at Step S33), the sheet information managing unit 301 determines whether the sheet information requested by the acquisition request is sheet roughness information (Step S35). When the requested sheet information is the sheet roughness information (YES at Step S35), the sheet information managing unit 301 requests the roughness information measuring unit 303 to measure smoothness (Step S36). Accordingly, the roughness information measuring unit 303 measures the smoothness of the sheet being a printing object placed on the tray, and stores the measured smoothness, as the sheet roughness information, in the sheet information storage unit 304.

The sheet information managing unit 301 acquires the sheet information, such as the sheet type, the sheet glossiness, or the sheet roughness information, stored in the sheet information storage unit 304 (Step S37). The sheet information managing unit 301 transmits the acquired sheet information to the DFE 50 via the MIC 60 (Step S38).

As described above, according to the first embodiment, a plurality of surface-effect selection tables are provided in advance, in each of which different types of surface effects are designated depending on sheet types. Then, a sheet type contained in the sheet information of a printing object is acquired, a surface-effect selection table corresponding to the sheet type is selected, and clear-toner plane data is generated by using gloss-control plane data. Therefore, it is possible to obtain a surface effect desired by a user regardless of the sheet type.

Second Embodiment

In the first embodiment, the surface-effect selection table for each piece of the sheet information is stored in the surface-effect selection table storage unit 561. By contrast, in a second embodiment, when the acquired sheet information is not stored in the surface-effect selection table storage unit 561, a surface-effect selection table based on the sheet information is generated and used.

As a configuration of an image forming system according to the second embodiment, similarly to the first embodiment, the host device 10, the DFE 50, the MIC 60, the printer 70, and the glosser 80 and the low-temperature fixing device 90 serving as the post-processors are connected to one another. The configurations and the functions of the host device 10, the DFE 50, the MIC 60, the printer 70, the glosser 80, and the low-temperature fixing device 90 are the same as those of the first embodiment. The color plane data, the types of the surface effects, the gloss-control plane data, the clear plane data, the density value selection table stored in the host device 10, and the configuration of the print data are the same as those of the first embodiment.

The DFE 50 of the second embodiment includes, similarly to the first embodiment, the rendering engine 51, the si1 unit 52, the TRC unit 53, the si2 unit 54, the halftone engine 55, a clear processing unit 2456, the si3 unit 57, the input unit 58, and the display unit 59. In the second embodiment, a configuration and functions of the clear processing unit 2456 are different from the first embodiment, and the configurations and the functions of the rendering engine 51, the si1 unit 52, the TRC unit 53, the si2 unit 54, the halftone engine 55, the si3 unit 57, the input unit 58, and the display unit 59 are the same as those of the first embodiment.

Figure 24:
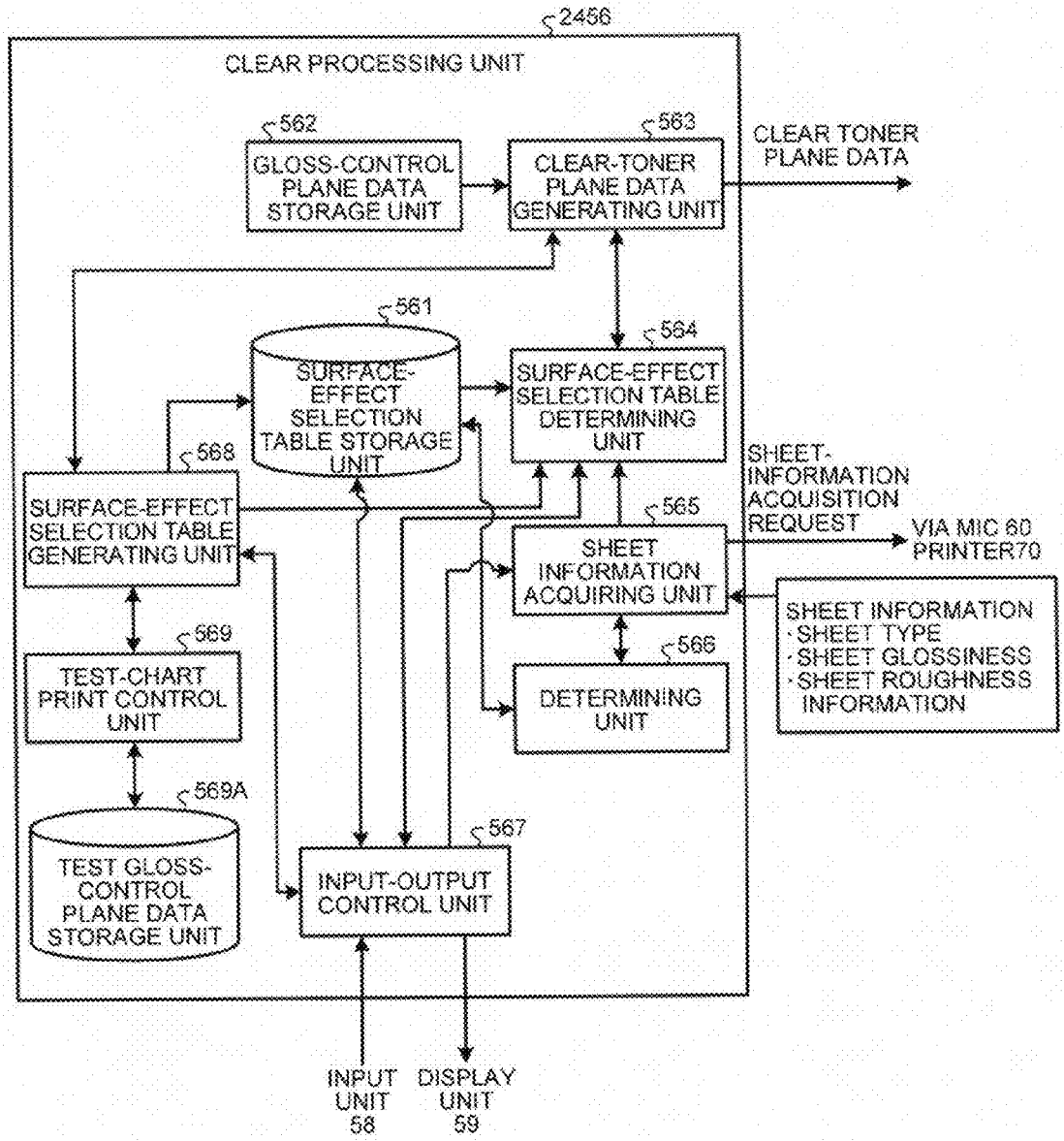
FIG. 24 is a diagram illustrating an example of a functional configuration of a clear processing unit according to a second embodiment.

FIG. 24 is a block diagram illustrating the functional configuration of the clear processing unit 2456.

As illustrated in FIG. 24, the clear processing unit 2456 mainly includes the surface-effect selection table storage unit 561, the gloss-control plane data storage unit 562, the surface-effect selection table determining unit 564, the clear-toner plane data generating unit 563, the sheet information acquiring unit 565, the input-output control unit 567, a determining unit 566, a surface-effect selection table generating unit 568, a test-chart print control unit 569, and a test gloss-control plane data storage unit 569A. The gloss-control plane data storage unit 562 and the surface-effect selection table determining unit 564 are the same as those of the first embodiment.

The surface-effect selection table storage unit 561 stores therein a surface-effect selection table (to be described later) in association with sheet information on a sheet (details will be described later). The surface-effect selection table storage unit 561 appropriately stores therein a surface-effect selection table in association with identification information for identifying a user and evaluation information.

Examples of the identification information stored in the surface-effect selection table storage unit 561 include account information. For example, a user account that is input when a user inputs sheet information via the input unit 58 may be used as the identification information. The evaluation information is, although details will be explained later, user-input information that indicates an evaluation result of each type of a surface effect based on a test chart formed of a group of patch images that are printed on a sheet based on test gloss-control plane data (details will be described later) and the surface-effect selection table. The evaluation information is input by the user for each type of the surface effect. Examples of the evaluation information include, but not limited to, evaluation "high", evaluation "moderate", and evaluation "low". The evaluation information is not limited to the three-level evaluation.

The surface-effect selection table storage unit 561 also stores therein sheet information on a sheet that is suitable for realizing each type of a surface effect, in association with each type of the surface effect to be applied to the sheet.

The sheet information that corresponds to each type of a surface effect and that is about a sheet suitable to realize each type of the surface effect may be input in advance by an operation instruction issued by a user via the input unit 58, and stored in the surface-effect selection table storage unit 561 by the input-output control unit 567. The sheet information that corresponds to each type of a surface effect and that is about a sheet suitable to realize each type of the surface effect may be obtained in advance based on evaluation information corresponding to each of the surface-effect selection tables stored in the surface-effect selection table storage unit 561, and stored in the surface-effect selection table storage unit 561. In this case, for example, the input-output control unit 567 reads sheet information corresponding to the surface-effect selection table in which the highest evaluation information is set, from the surface-effect selection table storage unit 561 for each type of the surface effect, and stores the read sheet information in the surface-effect selection table storage unit 561 in association with the surface effect of a type corresponding to the highest evaluation information.

Similarly to the first embodiment, the clear-toner plane data generating unit 563 determines a surface effect corresponding to the density value (pixel value) of each pixel of the gloss-control plane data, and determines on or off of the glosser 80 according to the determination of the surface effect. Similarly to the first embodiment, the clear-toner plane data generating unit 563 appropriately generates an inverse mask or a solid mask by using the input CMYK 8-bit color plane data and the gloss-control plane data according to the determination, to thereby appropriately generate 2-bit clear-toner plane data for attaching a clear toner. The inverse mask is the same as that of the first embodiment.

When the evaluation information is stored in the surface-effect selection table storage unit 561 in association with the surface-effect selection table determined by the surface-effect selection table determining unit 564, the clear-toner plane data generating unit 563 replaces a surface effect corresponding to the density value indicated by the surface-effect selection table determined by the surface-effect selection table determining unit 564 with another surface effect based on the evaluation information. Subsequently, based on the density value corresponding to the replaced type of the surface effect and the gloss-control plane data stored in the gloss-control plane data storage unit 562, the clear-toner plane data generating unit 563 determines a surface effect associated with the density value (pixel value) of each pixel of the gloss-control plane data.

When receiving a test chart print request from the surface-effect selection table generating unit 568 to be explained later, the clear-toner plane data generating unit 563 generates, as clear-toner plane data, test clear-toner plane data used to form a test chart formed of patch images for each type of the surface effect designated by the test gloss-control plane data, based on a predetermined one (for example, for a plain paper) of the surface-effect selection tables stored in the surface-effect selection table storage unit 561 and based on the test gloss-control plane data received from the surface-effect selection table generating unit 568.

The test chart is an image containing a plurality of patch images for different types of surface effects. The test gloss-control plane data is image data in which a plurality of the patch images are designated. Specifically, the test gloss-control plane data is image data, in which a type of a surface effect of each of the patch images having the different types of the surface effects and an area in which each of the patch images is formed are designated.

More specifically, when receiving a test chart print request from the surface-effect selection table generating unit 568, the clear-toner plane data generating unit 563 determines a surface effect corresponding to the density value (pixel value) of each pixel of the test gloss-control plane data by referring to a predetermined one of the surface-effect selection tables (for example, for a plain paper) stored in the surface-effect selection table storage unit 561 by using the test gloss-control plane data. The clear-toner plane data generating unit 563 determines on or off of the glosser 80 according to the determination. The clear-toner plane data generating unit 563 appropriately generates an inverse mask or a solid mask to attach a clear toner by using the test color plane data and the test gloss-control plane data according to the determination, to thereby generate, as the clear-toner plane data for attaching a clear toner, 2-bit test clear-toner plane data for forming the test chart formed of a group of the patch images for different types of the surface effects are applied.

The test color plane data is image data used to form, with a color toner, an explanation image (text or the like) of each of the patch images, for each type of a surface effect designated by the test clear-toner plane data. Specifically, the test color plane data is image data for designating images (text or the like) that are formed with a color toner at positions corresponding to the positions of a plurality of types of the patch images designated by the test clear-toner plane data on a recording medium, and that indicate the types of the surface effects of the respective patch images. The test color plane data also designates images (text or the like) indicating density values (or density ratios) corresponding to the respective types of the surface effects. The test color plane data may be formed for each of four planes for the CMYK colors. However, it is sufficient to form at least one piece of the test color plane data (i.e., at least one plane) for at least one of the CMYK colors. The test color plane data is stored in advance in the clear-toner plane data generating unit 563, the si3 unit 57, or the test gloss-control plane data storage unit 569A. The clear-toner plane data generating unit 563 and the si3 unit 57 appropriately read and use the test color plane data when the test color plane data is used.

The surface-effect selection table storage unit 561 stores therein the sheet information and different surface-effect selection tables for the respective types of the sheet information in association with the sheet information, similarly to the first embodiment. The surface-effect selection table is the same as that of the first embodiment.

The sheet information acquiring unit 565 acquires the sheet information on a sheet of paper that is a printing object of the printer 70 from the printer 70 via the MIC 60, similarly to the first embodiment. The sheet information acquiring unit 565 outputs the acquired sheet information to the surface-effect selection table determining unit 564 and the determining unit 566. When receiving setting of the sheet information from a user via the input-output control unit 567, the sheet information acquiring unit 565 outputs the input user-set sheet information to the surface-effect selection table determining unit 564 and the determining unit 566.

The determining unit 566 determines whether the sheet information received by the sheet information acquiring unit 565 is stored in the surface-effect selection table storage unit 561. Specifically, the determining unit 566 determines whether a comparison condition contained in the sheet information received from the sheet information acquiring unit 565 matches a comparison condition contained in the sheet information stored in the surface-effect selection table storage unit 561, to thereby determine whether the received sheet information is already stored in the surface-effect selection table storage unit 561. The determining unit 566 receives the comparison condition used for the determination by the determining unit 566 from the input-output control unit 567.

The input-output control unit 567 causes the display unit 59 to display the sheet type setting screen, the glossiness setting screen, the smoothness setting screen, and the sheet information registration screen, similarly to the first embodiment. The sheet type setting screen, the glossiness setting screen, the smoothness setting screen, and the sheet information registration screen are the same as those of the first embodiment.

The input-output control unit 567 also causes the display unit 59 to display an evaluation information input screen, a comparison condition input screen, a surface-effect selection table search screen, a surface-effect selection table search result screen, and a sheet display screen.

The comparison condition input screen is a screen for allowing a user to designate a comparison condition. The comparison condition is used by the determining unit 566 to determine whether the sheet information acquired by the sheet information acquiring unit 565 is already stored in the surface-effect selection table storage unit 561.

Figure 25:
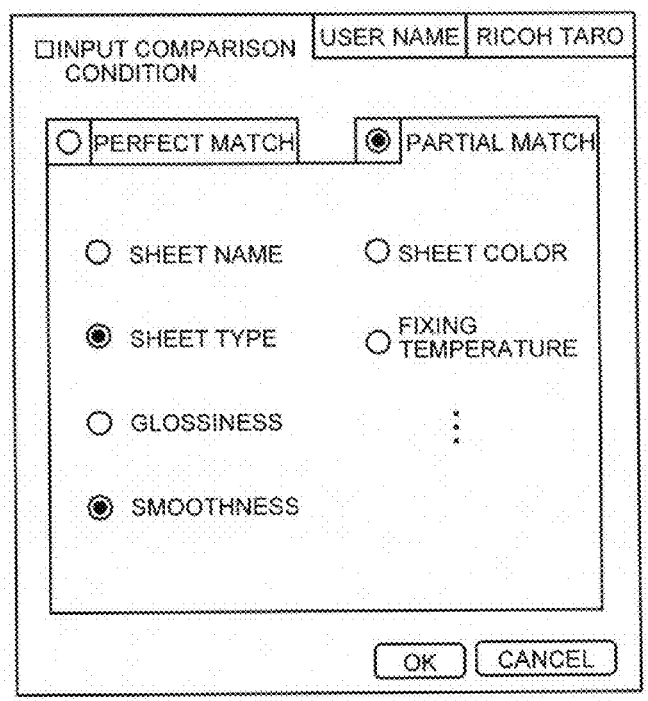
FIG. 25 is a diagram illustrating an example of a comparison condition input screen.

FIG. 25 is a diagram illustrating an example of the comparison condition input screen. As illustrated in FIG. 25, the comparison condition input screen displays buttons to select "perfect match" indicating all of the conditions contained in the sheet information or "partial match" indicating a part of the conditions contained in the sheet information. In the "partial match" section, for example, conditions, such as "sheet name", "sheet type", "glossiness", "smoothness", "sheet color", and "fixing temperature", and radio buttons for individually designating the conditions are displayed. A user can designate any of the conditions, such as "sheet name", "sheet type", "glossiness", "smoothness", "sheet color", and "fixing temperature", as a comparison condition by the radio buttons. The designated comparison condition is notified, as an input event, to the input-output control unit 567.

Figure 26:
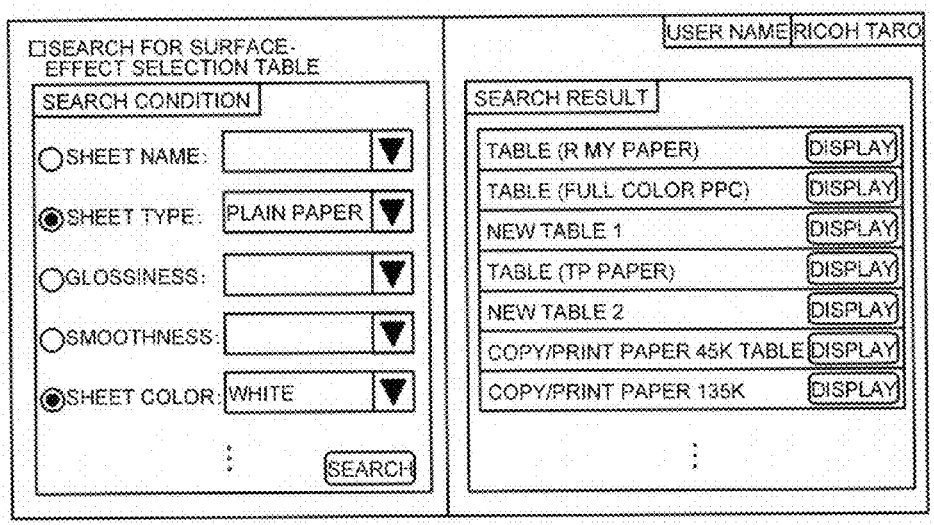
FIG. 26 is a diagram illustrating an example of a surface-effect selection table search screen.

The surface-effect selection table search screen is a screen for displaying a search condition and a search result of the surface-effect selection tables stored in the surface-effect selection table storage unit 561. FIG. 26 is a diagram illustrating an example of the surface-effect selection table search screen. FIG. 27 is a diagram illustrating an example of the search result screen.

As illustrated in FIG. 26, the surface-effect selection table search screen displays radio buttons for setting "sheet name", "sheet type", "glossiness", "smoothness", "sheet color", or the like as a "search condition". Selection buttons for designating detailed conditions for the respective search conditions are also displayed. A user can designate any of the conditions such as "sheet name", "sheet type", "glossiness", "smoothness", and "sheet color" as the search condition, and the detailed conditions by using the radio buttons. The designated search condition is notified, as an input event, to the input-output control unit 567.

The input-output control unit 567 that has received the search condition searches for sheet information containing information that meets the received search condition, searches for a surface-effect selection table corresponding to the sheet information from the surface-effect selection table storage unit 561, and causes the display unit 59 to display the surface-effect selection table search result screen containing the search result.

FIG. 26 illustrates an example of the surface-effect selection table search result screen. As illustrated in FIG. 26, the surface-effect selection table search result screen displays a list of pieces of sheet identification information (e.g., sheet names) corresponding to the search condition, as a "search result" obtained according to the search condition. A user can designate a corresponding "display" button for designating a desired piece of the identification information from the displayed list of the pieces of the sheet identification information, by instruction operation via the input unit 58.

The input-output control unit 567 causes the display unit 59 to display the surface-effect selection table search screen containing a surface-effect selection table corresponding to the sheet identification information displayed in a display section of the designated "display" button. Therefore, for example, the display unit 59 displays a surface-effect selection table that meets the search condition selected by the user.

Figure 28:
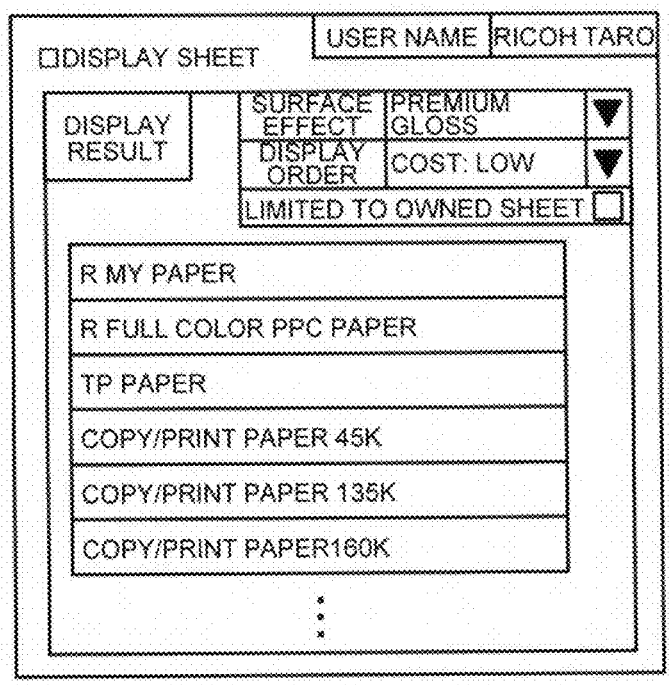
FIG. 28 is a diagram illustrating an example of a sheet display screen.
Figure 29:
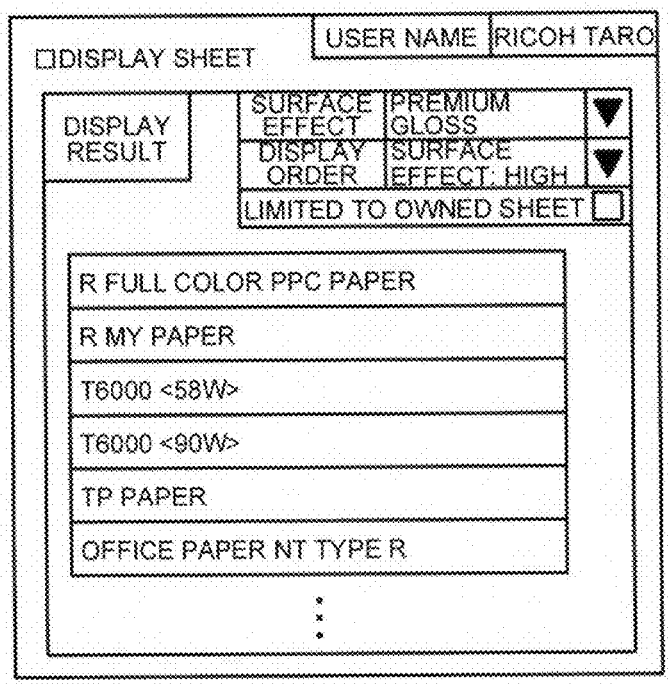
FIG. 29 is a diagram illustrating another example of the sheet display screen.
Figure 30:
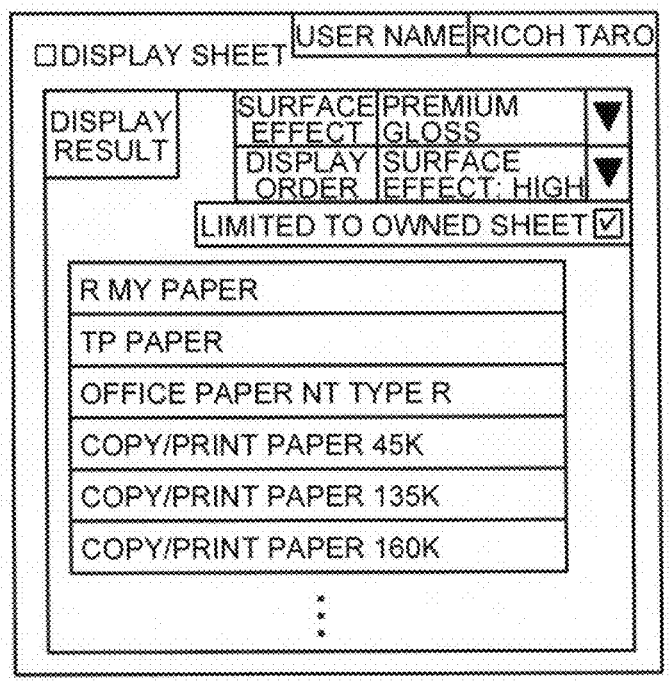
FIG. 30 is a diagram illustrating a still another example of the sheet display screen.

The input-output control unit 567 causes the display unit 59 to display the sheet display screen. FIG. 28 to FIG. 30 are diagrams illustrating examples of the sheet display screen.

As illustrated in FIG. 28, the sheet display screen contains two display sections of a "user name" and a "surface effect". In the "user name" section, for example, user identification information on a user who has activated the sheet display screen is displayed. As the identification information, for example, it may be possible to use identification information, such as account information, that is input when the user inputs an activation instruction for the sheet display screen by instruction operation via the input unit 58.

In the "surface effect" section, selection buttons for selecting a type of a "surface effect" or selection buttons for selecting a "display order" as a display condition are displayed. A radio button is also displayed for designating whether to display only a sheet owned by a user. The types of the "surface effect" and the "display order" of items in a list to be selected can be changed by pressing arrows in the screen.

As the display condition, a radio button for designating "limited to user-owned sheet" is also displayed. The radio button for designating "limited to user-owned sheet" is used to designate display of sheet information corresponding to the user identification information. The surface-effect selection table storage unit 561 stores therein sheet information in advance in association with the user identification information, as the sheet information on a sheet owned by each user. For example, the clear processing unit 2456 sequentially stores sheet information on a sheet, on which an image is first formed after the user identification information is input by a user via the input unit 58, in the surface-effect selection table storage unit 561 in association with the identification information.

A user can designate, as the display condition, a radio button of the type of the "surface effect", the "display order", or "limited to user-owned sheet". FIG. 28 is a schematic diagram illustrating an example in which a user gives an instruction to display a sheet display condition that meets display conditions such as the "surface effect" of specular gloss, the "display order" of ascending order of costs, and no limitation to user-owned sheet, by instruction operation via the input unit 58. The designated sheet display condition is notified, as an input event, to the input-output control unit 567.

The input-output control unit 567 reads, from the surface-effect selection table storage unit 561, the sheet information corresponding to the type of the surface effect (the sheet information appropriate for the type of the surface effect) contained in the input sheet display condition, and causes the display unit 59 to display the sheet information in the display order indicated by the sheet display condition. When the input sheet display condition contains information indicating "limited to user-owned sheet", the input-output control unit 567 reads sheet information corresponding to the type of the surface effect contained in the input sheet display condition from the surface-effect selection table storage unit 561, and causes the display unit 59 to display sheet information that is stored in the surface-effect selection table storage unit 561 in association with the user identification information input via the input unit 58, from among the read pieces of the sheet information in the display order indicated by the sheet display conditions.

FIG. 28 is a schematic diagram illustrating an example of the sheet display screen when a user gives an instruction to display a sheet display condition that meets display conditions such as the "surface effect" of specular gloss, the "display order" of ascending order of costs, and no limitation to user-owned sheet, by instruction operation via the input unit 58.

FIG. 29 is a schematic diagram illustrating an example of the sheet display screen when a user gives an instruction to display a sheet display condition that meets display conditions such as the "surface effect" of specular gloss, the "display order" of descending order of the surface effect, and no limitation to user-owned sheet, by instruction operation via the input unit 58.

FIG. 30 is a schematic diagram illustrating an example of the sheet display screen when a user gives an instruction to display a sheet display condition that meets display conditions such as the "surface effect" of specular gloss, the "display order" of descending order of the surface effect, and limitation to user-owned sheet, by instruction operation via the input unit 58.

The input-output control unit 567 causes the display unit 59 to display the evaluation information input screen.

FIG. 31 is a diagram illustrating an example of the evaluation information input screen. The evaluation information input screen is an input screen displayed on the display unit 59 when a user inputs an evaluation result of each type of a surface effect for each sheet on which an image is to be formed, based on the test chart formed on a recording medium.

The test chart is formed by the printing apparatus 30 by transmitting the image data, which contains the test clear-toner plane data used for forming patch images of the respective types of the surface effects designated by the test gloss-control plane data on a recording medium and contains the test color plane data, to the printing apparatus 30 from the DFE 50 via the MIC 60.

Figure 32:
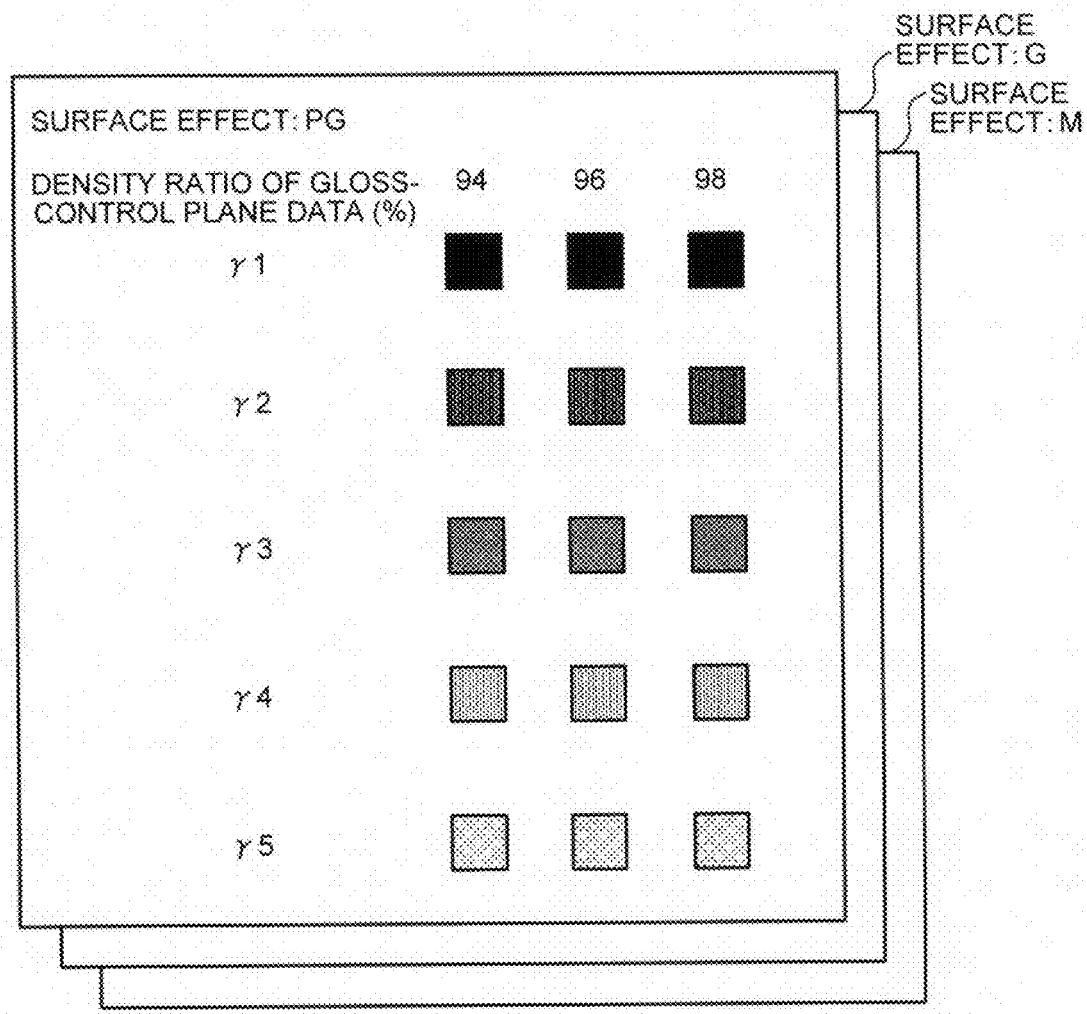
FIG. 32 is a schematic diagram illustrating an example of a test chart image generated on a recording medium.

FIG. 32 is a schematic diagram illustrating an example of the test chart formed on a recording medium. As illustrated in FIG. 32, for example, the test chart is formed of a group of patch images for different types of surface effects (i.e., different density ratios (density values)).

In the example illustrated in FIG. 32, as patch images corresponding to Premium Gloss (PG), patch images subjected to different types of gamma correction ($\gamma 1$ to $\gamma 5$) are illustrated for every 2% change in the density ratio corresponding to a surface effect of the same large classification. The surface effect of the same large classification is a classification obtained by classifying the types of the surface effects according to the contents of the surface effects. Examples of the large classification include "specular gloss", "solid gloss", "halftone matte", and "delustered". Each of the surface effects of the large classifications is further classified into "specular gloss type A" to "specular gloss type C", "solid gloss type 1" to "solid gloss type 4", "halftone matte type 1" to "halftone matte type 4", or "delustered type A" to "delustered type C" as illustrated in FIG. 11 for example.

In FIG. 32, an example is illustrated in which the types of the surface effects are classified into four large classifications of specular gloss, solid gloss, halftone matte, and delustered, and patch images for further-classified types are formed as a test chart on a different recording medium for each type of the surface effects. However, it may be possible to form a test chart including patch images corresponding to all types of the surface effects in one recording medium.

In FIG. 32, the patch images are images formed by applying a clear toner to the recording medium based on the test clear-toner plane data. The explanation image of each of the patch images (in FIG. 32, "the surface effect:PG", "density ratio (%) of gloss-control plane data", "94", "96", "98", and images indicating the values (γ1 to γ5) of the gamma correction are formed by applying a color toner to the recording medium based on the test color plane data.

Referring back to FIG. 31, the evaluation information input screen displays a display section of sheet identification information (in FIG. 31, sheet name) for identifying a sheet on which the test chart is formed, a display section of a user name, and selection buttons (arrows in the screen) for setting evaluation information for the respective types of the surface effects.

The sheet identification information (in this example, sheet name) displayed on the evaluation information input screen may be a sheet name corresponding to sheet information that is most-recently acquired by the sheet information acquiring unit 565 and that is determined as having not been registered in the surface-effect selection table storage unit 561 by the determining unit 566. In the display section of the user name, for example, user identification information (account or the like) input together with the evaluation information via the input unit 58.

The evaluation information, such as evaluation "high", "moderate", or "low", is input by selecting the display position of a selection button (an arrow in the screen) that is displayed in association with each type of the surface effect, by instruction operation via the input unit 58.

When an "OK" button on the evaluation information input screen is operated, the user name (user identification information), the sheet name (the sheet information), and information indicating the evaluation information corresponding to each type of the surface effect displayed on the evaluation information input screen are input to the input-output control unit 567.

The clear-toner plane data generating unit 563 of the clear processing unit 2456 generates the clear-toner plane data or the test clear-toner plane data as described above. The generated clear-toner plane data (or test clear-toner plane data and test color plane data) are output to the si3 unit 57.

The si3 unit 57 integrates the CMYK 2-bit color plane data subjected to the halftone processing and the 2-bit clear-toner plane data generated by the clear processing unit 2456, and outputs the integrated image data to the MIC 60, similarly to the first embodiment. When receiving the test clear-toner plane data and the test color plane data from the clear processing unit 2456, the si3 unit 57 outputs test chart data, in which the test color plane data subjected to the halftone processing and the 2-bit test clear-toner plane data are integrated, as image data to the MIC 60.

The MIC 60 outputs the device configuration information indicating configurations of devices mounted as post-processors to the DFE 50, similarly to the first embodiment. The MIC 60 receives the color plane data (or the test color plane data) and the clear-toner plane data (or the test clear-toner plane data) from the DFE 50, allocates each piece of the image data to a corresponding devices, and controls the post-processors.

Specifically, as illustrated by example in FIG. 19, the MIC 60 outputs the CMYK color plane data (or the test color plane data) to the printer 70 from among pieces of the image data output by the DFE 50, outputs the clear-toner plane data (or the test clear-toner plane data) used by the printer 70 to the printer 70 if the clear-toner plane data is provided, turns on or off the glosser 80 by using the on/off information output by the DFE 50, and outputs the clear-toner plane data (or the test clear-toner plane data) used by the low-temperature fixing device 90 to the low-temperature fixing device 90 if the clear-toner plane data is provided.

When the image data output by the DFE 50 is the test chart data containing the test color plane data and the test clear-toner plane data, a color image designated by the test color plane data (an explanation image of each patch image) is formed on a recording medium with a color toner, and a test chart as a group of patch images of different types of surface effects designated by the test clear-toner plane data is formed on the recording medium with a clear toner.

Referring back to FIG. 24, when the sheet information received by the sheet information acquiring unit 565 is stored in the surface-effect selection table storage unit 561, the determining unit 566 outputs a determination request to determine a surface-effect selection table corresponding to the sheet information to the surface-effect selection table determining unit 564 via the sheet information acquiring unit 565. On the other hand, when the sheet information received by the sheet information acquiring unit 565 is not registered in the surface-effect selection table storage unit 561 (i.e., sheet information and a surface-effect selection table corresponding to the sheet information are not registered in the surface-effect selection table storage unit 561), the determining unit 566 outputs information indicating that the sheet information is not registered to the clear-toner plane data generating unit 563 via the sheet information acquiring unit 565 and the surface-effect selection table determining unit 564.

The surface-effect selection table determining unit 564 receives the determination request to determine the surface-effect selection table corresponding to the sheet information acquired by the sheet information acquiring unit 565 from the determining unit 566 via the sheet information acquiring unit 565. In this case, the surface-effect selection table determining unit 564 determines the surface-effect selection table corresponding to the sheet information acquired by the sheet information acquiring unit 565 from the surface-effect selection table storage unit 561.

The clear-toner plane data generating unit 563 refers to the surface-effect selection table determined by the surface-effect selection table determining unit 564 and evaluation information when the evaluation information is stored in association with the surface-effect selection table, and determines a surface effect corresponding to the density value (pixel value) of each pixel of the gloss-control plane data by using the gloss-control plane data stored in the gloss-control plane data storage unit 562 as described above. The clear-toner plane data generating unit 563 appropriately determines on or off of the glosser 80 and generates 2-bit clear-toner plane data according to the determination.

On the other hand, when receiving the information indicating that the sheet information acquired by the sheet information acquiring unit 565 is not registered from the determining unit 566, the clear-toner plane data generating unit 563 outputs an instruction to generate a surface-effect selection table corresponding to the sheet information to the surface-effect selection table generating unit 568. The generation instruction contains the sheet information acquired by the sheet information acquiring unit 565.

The surface-effect selection table generating unit 568 generates a surface-effect selection table corresponding to the sheet information received from the clear-toner plane data generating unit 563, that is, a surface-effect selection table corresponding to the sheet information that is not registered in the surface-effect selection table storage unit 561.

Specifically, upon receiving the request to generate the surface-effect selection table, the surface-effect selection table generating unit 568 outputs a test chart print request to the test-chart print control unit 569.

The test gloss-control plane data storage unit 569A stores therein test gloss-control plane data in advance. The test gloss-control plane data is data for designating the position of a patch image corresponding to each type of the surface effects and for designating a type of the surface effect. Specifically, the test gloss-control plane data is data for designating the type of each surface effect of a patch image and the position and range where the patch image is formed on the recording medium as explained above with reference to FIG. 32. The test gloss-control plane data is stored in the test gloss-control plane data storage unit 569A in advance.

The test-chart print control unit 569 reads the test gloss-control plane data stored in the test gloss-control plane data storage unit 569A upon reception of the test chart print request from the surface-effect selection table generating unit 568, and outputs the test gloss-control plane data to the clear-toner plane data generating unit 563 via the surface-effect selection table generating unit 568.

When receiving the test gloss-control plane data, the clear-toner plane data generating unit 563 reads a surface-effect selection table corresponding to predetermined sheet information (for example, plain paper) from the surface-effect selection table storage unit 561 via the surface-effect selection table determining unit 564. Then, the type of the surface effect of each patch image designated by the test gloss-control plane data is determined based on the density value indicated in the read surface-effect selection table.

The clear-toner plane data generating unit 563 determines on or off of the glosser 80 and appropriately generates an inverse mask or a solid mask based on the determination result and pre-stored 8-bit test color plane data for K for example, to thereby generate 2-bit test clear-toner plane data for attaching a clear toner according to the patch image. The clear-toner plane data generating unit 563 converts the 8-bit test color plane data into, for example, 2-bit test color plane data, and outputs the 2-bit test color plane data and the 2-bit test clear-toner plane data to the si3 unit 57.

When receiving the test clear-toner plane data and the test color plane data from the clear processing unit 2456, the si3 unit 57 generates, as image data, test chart data containing the received pieces of data, and outputs the test chart data to the printer 70.

Accordingly, the printer 70 generates a test chart formed of a group of patch images designated by the test clear-toner plane data on a recording medium with a clear toner, and generates an explanation image of each of patch images designated by the test color plane data on the recording medium with a color toner. Consequently, for example, the recording medium, on which the test chart formed of the group of the patch images and the explanation image (text) are formed as illustrated in FIG. 32, is obtained.

A user inputs, via the input unit 58, pieces of evaluation information corresponding to the respective types of the surface effects of the patch images of the test chart formed on the recording medium, by using the recording medium on which the test chart is formed and by referring to the evaluation information input screen displayed on the display unit 59. Therefore, information indicating the evaluation information corresponding to the user name (user identification information), the sheet name (the sheet information), and each type of the surface effect displayed on the evaluation information input screen is input to the input-output control unit 567.

The surface-effect selection table generating unit 568 stores the evaluation information on each type of the surface effect received from the input-output control unit 567 in the surface-effect selection table storage unit 561, in association with the surface-effect selection table used by the clear-toner plane data generating unit 563 when the test clear toner plane data is generated (in the second embodiment, a surface-effect selection table corresponding to the sheet information containing "plain paper"), and in association with sheet information that is most-recently obtained by the sheet information acquiring unit 565 and that is not registered in the surface-effect selection table storage unit 561.

In this way, the surface-effect selection table generating unit 568 stores, in the surface-effect selection table storage unit 561, the sheet information that is acquired by the sheet information acquiring unit 565 and that is not registered in the surface-effect selection table storage unit 561, in association with the surface-effect selection table corresponding to the sheet information, so that the surface-effect selection table corresponding to the sheet information that is not registered in the sheet information acquiring unit 565 is generated.

As described above, when the evaluation information is stored in the surface-effect selection table storage unit 561 in association with the surface-effect selection table determined by the surface-effect selection table determining unit 564, the clear-toner plane data generating unit 563 replaces a surface effect corresponding to the density value indicated in the surface-effect selection table determined by the surface-effect selection table determining unit 564, based on the corresponding evaluation information. Then, the clear-toner plane data generating unit 563 determines a surface effect corresponding to the density value (pixel value) of each pixel of the gloss-control plane data based on the density value corresponding to the replaced surface effect and based on the gloss-control plane data stored in the gloss-control plane data storage unit 562.

The clear-toner plane data generating unit 563 determines on or off of the glosser 80 according to the determination and appropriately generates an inverse mask or a solid mask by using the input CMYK 8-bit color plane data, to thereby appropriately generate the 2-bit clear-toner plane data for attaching a clear toner.

The functional configuration of the printer 70 is the same as the first embodiment explained above with reference to FIG. 20.

Figure 33:
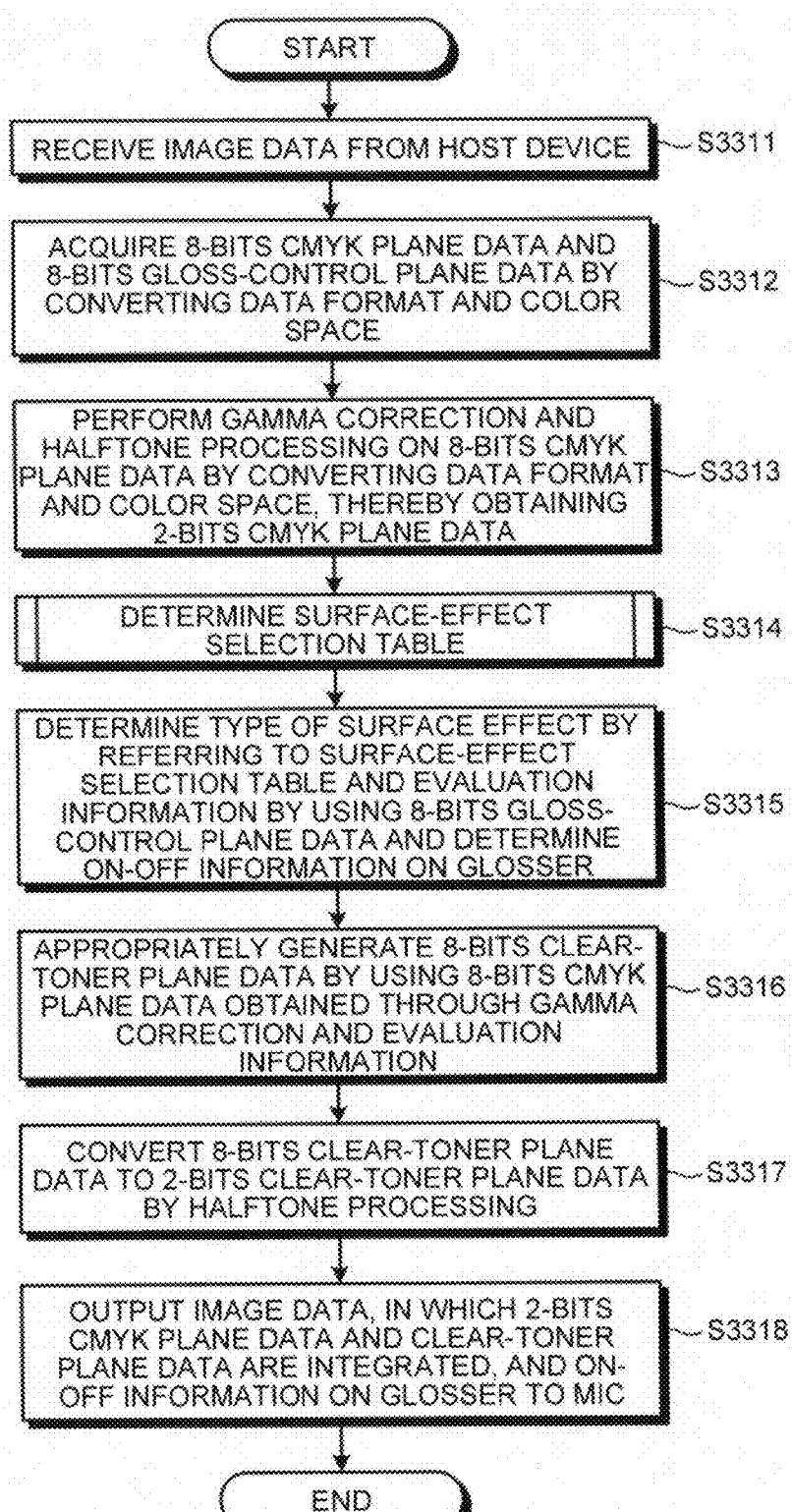
FIG. 33 is a flowchart illustrating the flow of a gloss control process performed by an image forming system according to the second embodiment.

The flow of a gloss control process performed by the DFE 50 of the image forming system according to the second embodiment will be explained below with reference to FIG. 33. In FIG. 33, the process from reception of the print data from the host device 10 to the surface-effect selection table determination process (Step S3311 to Step S3314) are performed in the same manner as the processes of the first embodiment (Step S11 to Step S14). However, details of the surface-effect selection table determination process are different from that of the first embodiment, and will be explained later).

The clear-toner plane data generating unit 563 of the clear processing unit 2456 determines on or off of the glosser 80, similarly to the first embodiment (Step S3315).

At Step S3315, when the evaluation information is stored in the surface-effect selection table storage unit 561 in association with the surface-effect selection table determined at Step S3314, the following process is performed.

Specifically, in this case, the clear-toner plane data generating unit 563 replaces, by using the 8-bit gloss-control plane data, the type of the surface effect corresponding to the density value indicated in the surface-effect selection table corresponding to the sheet type determined at Step S3314 with a type of a surface effect corresponding to a neighboring density value and higher evaluation information based on the corresponding evaluation information, and determines the replaced type as the type of the surface effect.

An example is explained below with reference to FIG. 31. For example, when the evaluation information on the surface effect "specular gloss type C" is "medium", the type of the surface effect corresponding to the density value of the surface effect "specular gloss type C" is replaced with the surface effect "specular gloss type B", which belongs to the same large classification of the surface effect "specular gloss", which has the closest density value, and which has higher evaluation information.

For example, when the evaluation information on the surface effect "solid gloss type 4" and the surface effect "solid gloss type 3" is "low", the clear-toner plane data generating unit 563 determines the types of the surface effect corresponding to the density values of the surface effects "solid gloss type 3" and "solid gloss type 4" with the surface effect "solid gloss type 2", which belongs to the same large classification of the surface effect "solid gloss", which has the closest density value, and which has higher evaluation information.

The clear-toner plane data generating unit 563 performs the above determination on all of the pixels of the gloss-control plane data. In this way, when the evaluation information is stored in the surface-effect selection table storage unit 561 in association with the surface-effect selection table determined at Step S3314, the clear-toner plane data generating unit 563 determines the surface effect of all of the pixels of the gloss-control plane data as a surface effect corresponding to the surface-effect selection table that is replaced based on the evaluation information. The clear-toner plane data generating unit 563 determines on or off of the glosser 80 according to the determination (Step S3315).

The clear-toner plane data generating unit 563 appropriately generates the 8-bit clear-toner plane data, similarly to the first embodiment (Step S3316). At Step S3316, when the evaluation information is stored in the surface-effect selection table storage unit 561 in association with the surface-effect selection table determined at Step S3314, the following process is performed.

Specifically, in this case, the clear-toner plane data generating unit 563 replaces, by using the 8-bit gloss-control plane data, the type of the surface effect corresponding to the density value indicated in the surface-effect selection table corresponding to the sheet type determined at Step S3314 with a type of a surface effect corresponding to the closest density value and higher evaluation information based on the evaluation information, and determines the replaced type as the type of the surface effect, similarly to the process at Step S3315.

The clear-toner plane data generating unit 563 appropriately generates an inverse mask or a solid mask by using the gloss-control plane data and the color plane data subjected to the gamma correction according to the determination, to thereby appropriately generate 2-bit clear-toner plane data for attaching a clear toner (Step S3316).

The halftone engine 55 performs halftone processing to convert the 8-bit clear-toner plane data generated at Step S3316 into 2-bit clear-toner plane data (Step S3317).

The Si3 unit 57 of the DFE 50 integrates the CMYK 2-bit color plane data obtained by the halftone processing at Step S3313 and the 2-bit clear-toner plane data generated at Step S3317, and outputs the integrated image data as image data and the on/off information indicating on or off of the glosser 80 determined at Step S3315 to the MIC 60 (Step S3318).

When the clear-toner plane data generating unit 563 does not generate the clear-toner plane data at Step S3316, only the CMYK 2-bit color plane data obtained by the halftone processing at Step S3313 is integrated and output to the MIC 60 at Step S3318.

Figure 34:
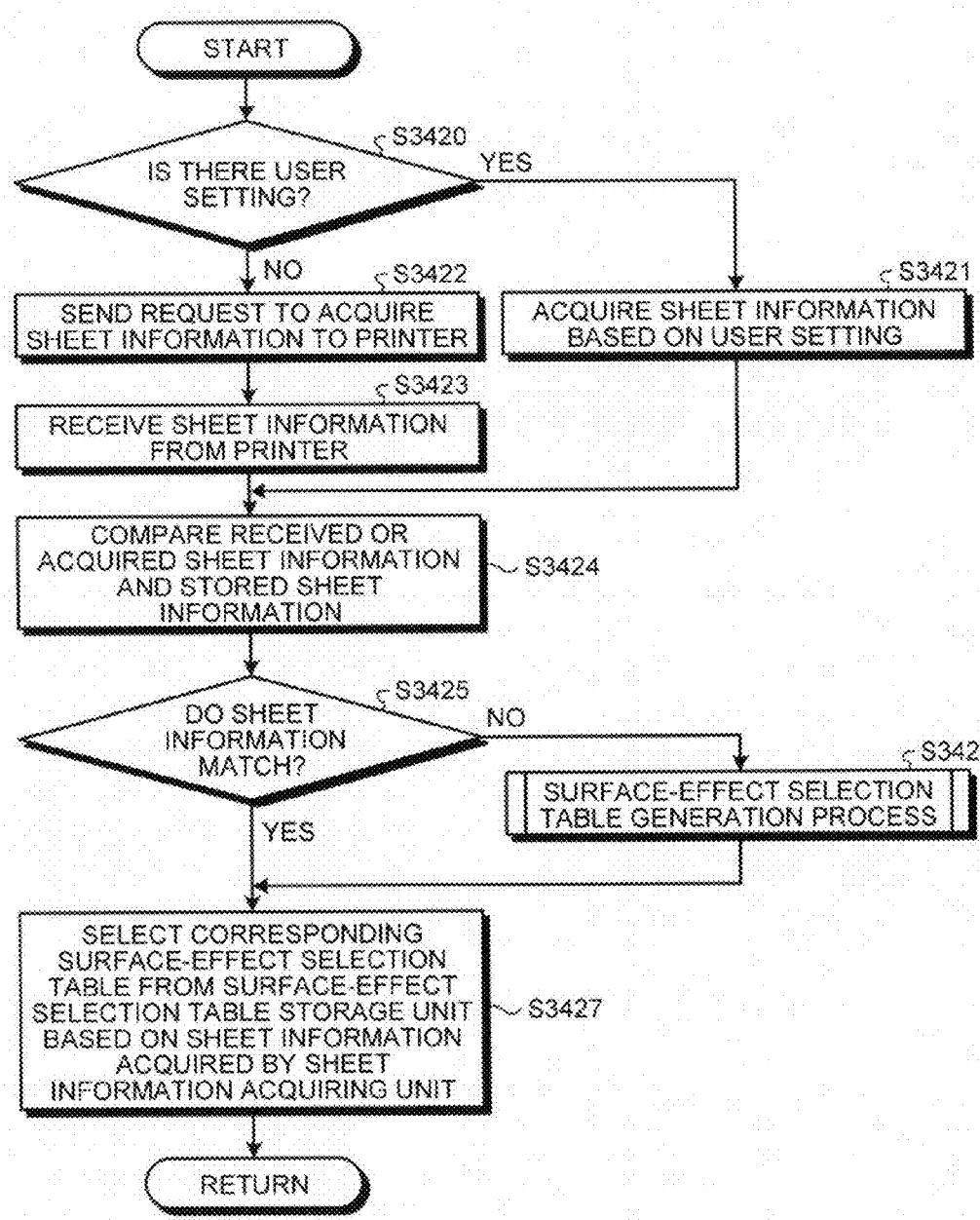
FIG. 34 is a flowchart illustrating the flow of a surface-effect selection table selection process according to the second embodiment.

The surface-effect selection table determination process at Step S3314 will be explained in detail below. FIG. 34 is a flowchart illustrating the flow of the surface-effect selection table determination process according to the second embodiment.

The surface-effect selection table determining unit 564 determines whether the sheet information is set by a user, similarly to the first embodiment (Step S3420).

When the sheet information is set by the user (YES at Step S3420), the surface-effect selection table determining unit 564 acquires the sheet information set by the user from the input-output control unit 567 or a RAM or the like (Step S3421).

On the other hand, when the sheet information is not set by the user at Step S3420 (NO at Step S3420), the sheet information acquiring unit 565 transmits a sheet information acquisition request to the printer 70 via the MIC 60, and acquires the sheet information (Step S3422). The sheet information acquiring unit 565 sends a request to acquire an element with the highest order set by the user from among the elements such as the sheet type, the sheet glossiness, and the sheet roughness information.

The sheet information acquiring unit 565 receives the sheet information from the printer 70 (Step S3423).

The determining unit 566 compares the sheet information acquired at Step S3421 or received at Step S3423 with the sheet information stored in the surface-effect selection table storage unit 561 (Step S3424).

The determining unit 566 determines whether the sheet information acquired at Step S3421 or received at Step S3423 matches any piece of the sheet information stored in the surface-effect selection table storage unit 561 (Step S3425).

At Step S3425, when it is determined that the received sheet information matches any piece of the sheet information stored in the surface-effect selection table storage unit 561 (YES at Step S3425), the process proceeds to Step S3427 to be described later. On the other hand, when it is determined that the received sheet information does not match any element of the sheet information stored in the surface-effect selection table storage unit 561 at Step S3425 (NO at Step S3425), the process proceeds to Step S3426. Then, the surface-effect selection table generation process to be explained in detail later is performed (Step S3426), and the process proceeds to Step S3427.

At Step S3427, the surface-effect selection table determining unit 564 selects a surface-effect selection table from the surface-effect selection table storage unit 561 based on the sheet information acquired at Step S3421 or Step S3423 (Step S3427). Specifically, the surface-effect selection table determining unit 564 specifies the sheet type contained in the acquired sheet information or the sheet type associated with the glossiness or the roughness information contained in the acquired sheet information as described above, and selects a surface-effect selection table corresponding to the specified sheet type.

The sheet information acquisition process performed by the printer 70 that has received the sheet information acquisition request at Step S3422 is performed in the same manner as in the first embodiment explained above with reference to FIG. 23.

Figure 35:
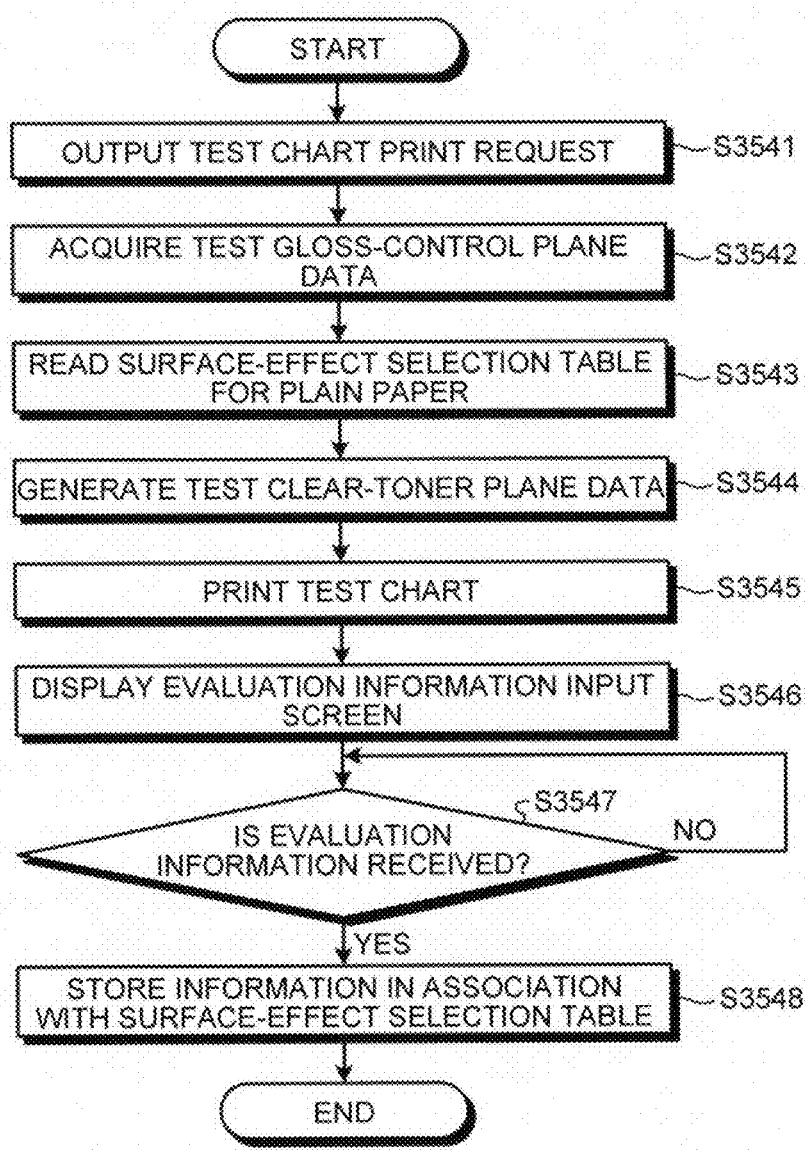
FIG. 35 is a flowchart illustrating the flow of a surface-effect selection table generation process.

The surface-effect selection table generation process at Step S3426 in FIG. 34 will be explained below. FIG. 35 is a flowchart illustrating the flow of the surface-effect selection table generation process according to the second embodiment. At Step S3425 in FIG. 34, when the determining unit 566 determines that the received sheet information does not match any piece of the sheet information stored in the surface-effect selection table storage unit 561 (NO at Step S3425), the clear-toner plane data generating unit 563 outputs a surface-effect selection table generation instruction to generate a surface-effect selection table corresponding to the sheet information to the surface-effect selection table generating unit 568, and the surface-effect selection table generation process illustrated in FIG. 35 is performed.

The surface-effect selection table generating unit 568 that has received the surface-effect selection table generation instruction outputs a test chart print request to the test-chart print control unit 569 (Step S3541). The test-chart print control unit 569 that has received the test chart print request acquires test gloss-control plane data from the test gloss-control plane data storage unit 569A (Step S3542). The surface-effect selection table generating unit 568 outputs the acquired test gloss-control plane data to the clear-toner plane data generating unit 563.

The clear-toner plane data generating unit 563 reads, as a predetermined one surface-effect selection table, a surface-effect selection table corresponding to the sheet information indicating the sheet type of plain paper in the second embodiment, from the surface-effect selection table storage unit 561 via the surface-effect selection table determining unit 564 (Step S3543).

The clear-toner plane data generating unit 563 generates test clear-toner plane data based on the test gloss-control plane data received from the surface-effect selection table generating unit 568, the pre-stored test color plane data, and the surface-effect selection table read at Step S3543 (Step S3544).

The printing apparatus 30 prints the test chart on the recording medium (Step S3545). Specifically, the si3 unit 57 generates, as image data, test chart data containing the test clear-toner plane data generated by the process at Step S3544 and the test color plane data used when the test clear toner plane data is generated, and outputs the generated test chart data to the MIC 60. Therefore, the printer 70 forms a test chart formed of a group of patch images designated by the test clear-toner plane data on a recording medium with a clear toner and forms an explanation image for each of patch images designated by the test color plane data on the recording medium with a color toner. Therefore, for example, a recording medium on which the test chart formed of the group of patch images and the explanation image (text) as illustrated in FIG. 32 is obtained.

Subsequently, the input-output control unit 567 causes the display unit 59 to display the evaluation information input screen (Step S3546). The input-output control unit 567 enters a standby state to wait to receive the evaluation information (NO at Step S3547 and S3547). Specifically, the input-output control unit 567 remains in the standby state until information on the evaluation information corresponding to the user name (user identification information), the sheet name (the sheet information), and the type of each surface effect displayed on the evaluation information input screen is input by instruction operation by the user via the input unit 58.

When the evaluation information is received from the user at Step S3547 (YES at Step S3547), the process proceeds to Step S3548.

At Step S3548, the surface-effect selection table generating unit 568 stores the surface-effect selection table read by the clear-toner plane data generating unit 563 through the process at Step S3543 in the surface-effect selection table storage unit 561 in association with the sheet information acquired by the sheet information acquiring unit 565 through the process at Step S3421 or Step S3423 (see FIG. 34) and in association with the evaluation information for each type of the surface effect received at Step S3547 (Step S3548). At this time, the user name (user identification information) or the sheet name received at Step S3547 may also be stored in an associated manner. Then, the routine is finished.

As described above, according to the second embodiment, when the acquired sheet information is not stored in the surface-effect selection table storage unit 561, a surface-effect selection table corresponding to the sheet information is generated and stored in the surface-effect selection table storage unit 561. Therefore, even when the sheet information and the surface-effect selection table corresponding to the sheet information are not stored in the surface-effect selection table storage unit 561, it is possible to appropriately generate a surface-effect selection table and clear-toner plane data corresponding to the sheet information.

Therefore, according to the second embodiment, it is possible to obtain a surface effect desired by a user regardless of the sheet type or regardless of whether the sheet information is registered or not.

Furthermore, according to the second embodiment, similarly to the first embodiment, it is possible to obtain a surface effect desired by a user regardless of the sheet type.

Third Embodiment

In the first and second embodiments, the clear processing unit 56 is provided in the DFE 50, and the DFE 50 performs the process for determining a surface-effect selection table and the process for generating clear-toner plane data. However, the present invention is not limited to this configuration.

Specifically, any of the processes performed by one device may be performed by one or more devices that are connected to the one device via a network.

As one example, in an image forming system according to a third embodiment, a part of the functions of a DFE is mounted on a server device on a network.

Figure 36:
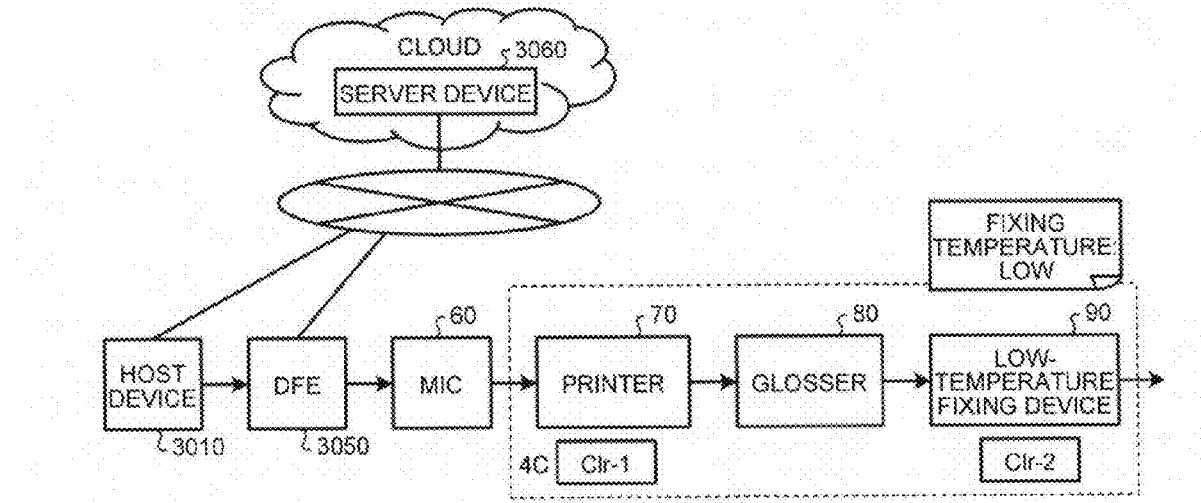
FIG. 36 is a diagram illustrating a configuration example of an image forming system according to a third embodiment.

FIG. 36 is a diagram illustrating a configuration example of the image forming system according to the third embodiment. As illustrated in FIG. 36, the image forming system according to the third embodiment includes a host device 3010, a DFE 3050, the MIC 60, the printer 70, the glosser 80, the low-temperature fixing device 90, and a server device 3060 on a cloud. The post-processor is not limited to the glosser 80 and the low-temperature fixing device 90.

According to the third embodiment, the host device 3010 and the DFE 3050 are connected to the server device 3060 via the network, such as the Internet. Furthermore, according to the third embodiment, a module for performing the process for generating each plane data by the host device 10 of the first and second embodiments, and the clear processing units 56 and 2456 of the DFE 50 of the first and second embodiments are provided in the server device 3060.

The connection configuration of the host device 3010, the DFE 3050, the MIC 60, the printer 70, the glosser 80, and the low-temperature fixing device 90 is the same as those of the first and second embodiments.

Specifically, in the third embodiment, the host device 3010 and the DFE 3050 are connected to the single server device 3060 via a network (cloud), such as the Internet. The server device 3060 includes a plane data generating unit 3062, a print data generating unit 3063, and a clear processing unit 3066. The server device 3060 performs a plane data generation process for generating color plane data, clear plane data, and gloss-control plane data, a print data generation process, a surface-effect selection table determination process, and a clear-toner plane data generation process.

Figure 37:
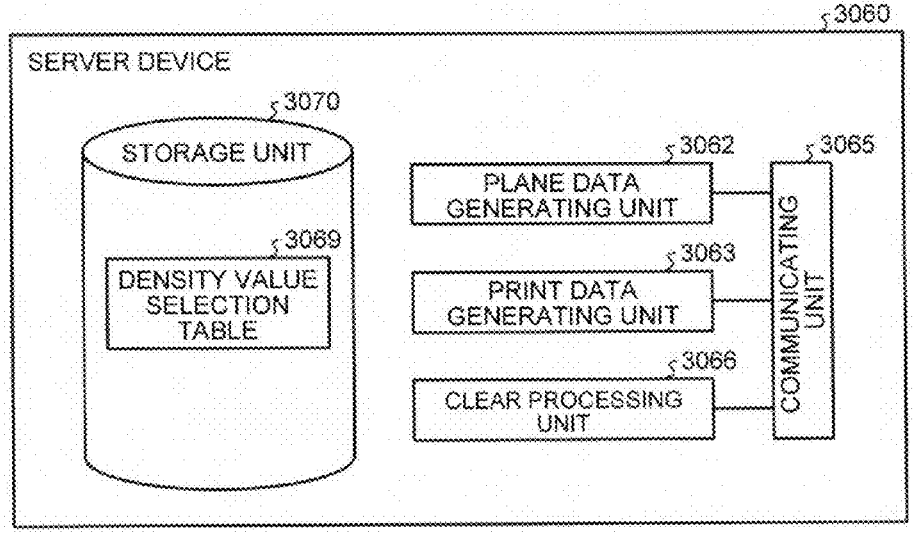
FIG. 37 is a block diagram illustrating a functional configuration of a server device according to the third embodiment.

The server device 3060 will be explained below. FIG. 37 is a block diagram illustrating a functional configuration of the server device 3060 according to the third embodiment. As illustrated in FIG. 37, the server device 3060 mainly includes a storage unit 3070, the plane data generating unit 3062, the print data generating unit 3063, the clear processing unit 3066, and a communicating unit 3065.

The storage unit 3070 is a storage medium, such as an HDD or a memory, and stores therein a density value selection table 3069. The density value selection table 3069 is the same as the density value selection table 3069 of the first embodiment explained above with reference to FIG. 6.

The communicating unit 3065 transmits and receives various types of data and requests to and from the host device 3010 and the DFE 3050. Specifically, the communicating unit 3065 receives image designation information, designation information, and a print data generation request from the host device 3010, and transmits the generated print data to the host device 3010. The communicating unit 3065 receives 8-bit gloss-control plane data, 8-bit color plane data, and a clear-toner plane data generation request from the DFE 3050, and transmits the generated clear-toner plane data and the on/off information to the DFE 3050.

The plane data generating unit 3062 generates the color plane data, the gloss-control plane data, and the clear plane data similarly to the host device 10 of the first and second embodiments.

The print data generating unit 3063 of the third embodiment generates the print data as illustrated in FIG. 8, similarly to the host device 10 of the first and second embodiments.

The clear processing unit 3066 has the same functions as those of the clear processing unit 56 of the DFE 50 of the first embodiment, and the functional configuration is the same as the functional configuration illustrated in FIG. 10. Alternatively, the clear processing unit 3066 may have the same functions as those of the clear processing unit 2456 of the DFE 50 of the second embodiment, and the functional configuration may be the same as the functional configuration illustrated in FIG. 24.

Figure 38:
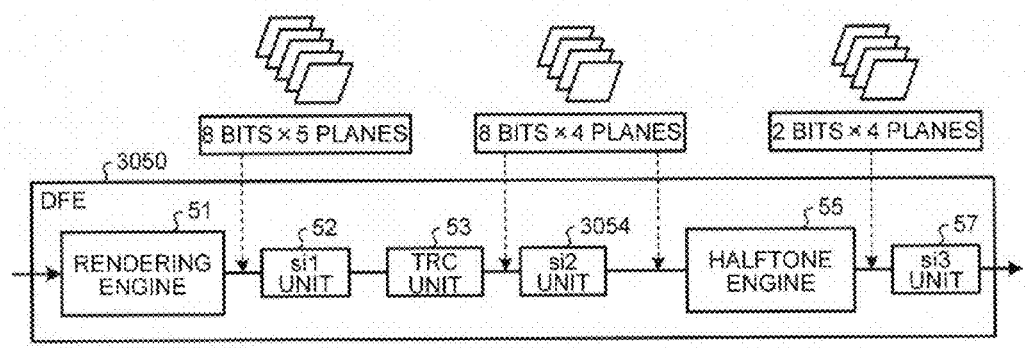
FIG. 38 is a block diagram illustrating a functional configuration of a DFE according to the third embodiment.

The DFE 3050 will be explained below. FIG. 38 is a block diagram illustrating a functional configuration of the DFE 3050 according to the third embodiment. The DFE 3050 of the third embodiment mainly includes the rendering engine 51, the si1 unit 52, the TRC unit 53, an si2 unit 3054, the halftone engine 55, and the si3 unit 57. The functions and the configurations of the rendering engine 51, the si1 unit 52, the TRC unit 53, the halftone engine 55, and the si3 unit 57 are the same as those of the DFE 50 of the first and second embodiments.

The si2 unit 3054 according to the third embodiment transmits the 8-bit gloss-control plane data subjected to the gamma correction by the TRC unit 53, the CMYK 8-bit color plane data, and a clear-toner plane data generation request to the server device 3060, and receives the clear-toner plane data and the on/off information from the server device 3060.

Figure 39:
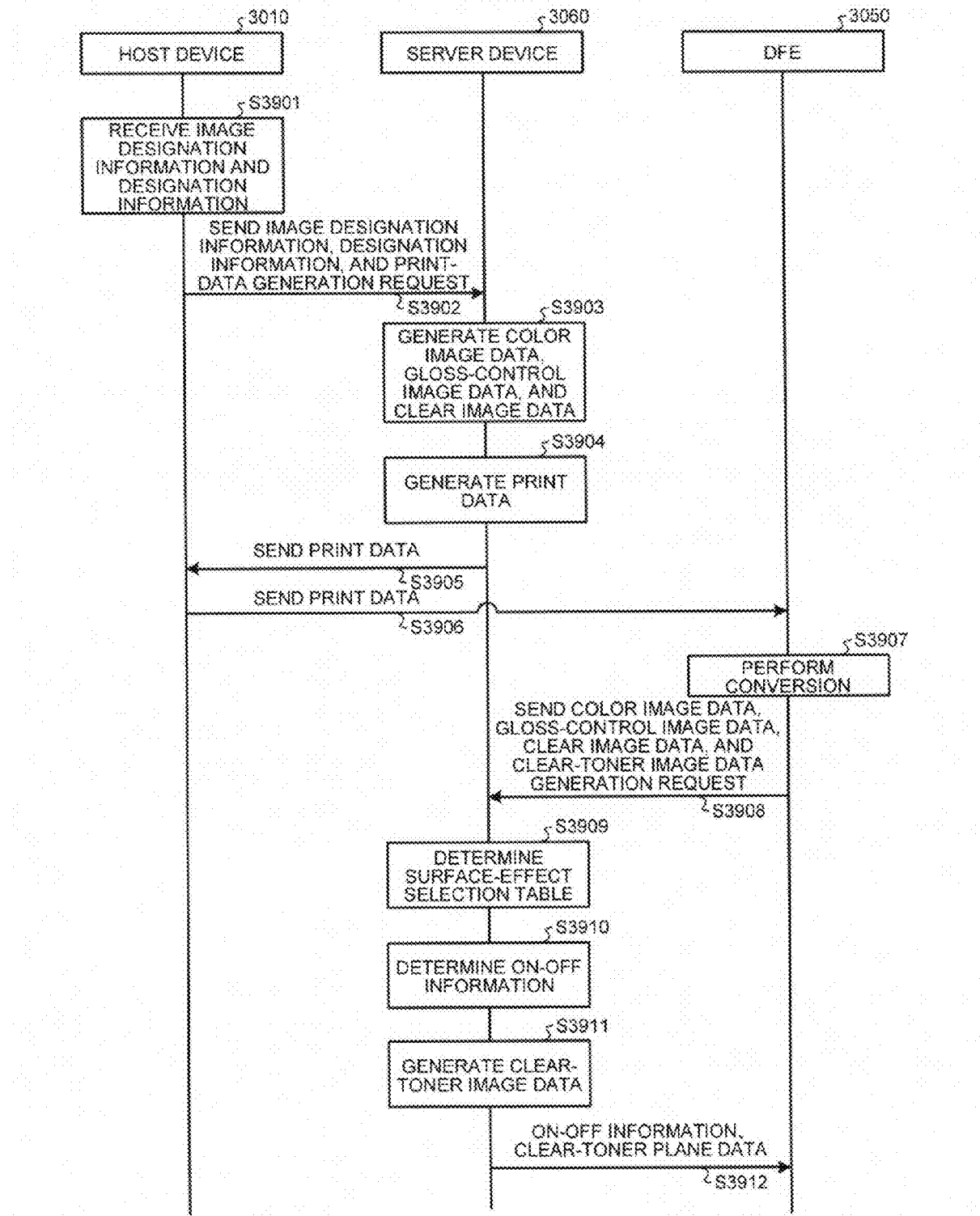
FIG. 39 is a sequence diagram illustrating the overall flow of a clear-toner plane data generation process according to the third embodiment.

The clear-toner plane data generation process that is needed for a printing process performed by the image forming system of the third embodiment configured as above will be explained below. FIG. 39 is a sequence diagram illustrating the overall flow of the clear-toner plane data generation process according to the third embodiment.

The host device 3010 receives image designation information and designation information from a user (Step S3901), and transmits the image designation information, the designation information, and a print data generation request to the server device 3060 (Step S3902).

The server device 3060 receives the image designation information, the designation information, and the print data generation request, and generates color plane data, gloss-control plane data, and clear plane data (Step S3903). The server device 3060 generates print data from the pieces of the image data (Step S3904), and transmits the generated print data to the host device 3010 (Step S3905).

Upon receiving the print data, the host device 3010 transmits the print data to the DFE 3050 (Step S3906).

Upon receiving the print data from the host device 3010, the DFE 3050 analyzes the print data to obtain the color plane data, the gloss-control plane data, and the clear plane data, and performs conversion or correction on the pieces of the image data (Step S3907). The DFE 3050 transmits the color plane data, the gloss-control plane data, the clear plane data, and a clear-toner plane data generation request to the server device 3060 (Step S3908).

When the server device 3060 receives the color plane data, the gloss-control plane data, the clear plane data, and the clear-toner plane data generation request, the clear processing unit 3066 acquires sheet information on a printing object and selects a surface-effect selection table based on the sheet information (Step S3909). The surface-effect selection table determination process is performed in the same manner as the process performed by the clear processing unit 56 of the DFE 50 of the first embodiment explained above with reference to FIG. 22. Alternatively, the surface-effect selection table determination process may be performed in the same manner as the process performed by the clear processing unit 2456 of the DFE 50 of the second embodiment explained above with reference to FIGS. 34 and 35.

The server device 3060 determines the on/off information (Step S3910), and generates clear-toner plane data (Step S3911). The server device 3060 transmits the generated clear-toner plane data to the DFE 3050 (Step S3912).

The subsequent processes performed by the MIC 60, the printer 70, the glosser 80, and the low-temperature fixing device 90 are performed in the same manner as those of the first and second embodiments.

As described above, according to the third embodiment, the process for generating the color plane data, the gloss-control plane data, the clear plane data, the print data, and the clear-toner plane data, and the surface-effect selection table determination process are performed by the server device 3060 on the cloud. Therefore, it is possible to achieve the same advantageous effects as those of the first and second embodiments. Furthermore, it is possible to integrally change the density value selection table or the surface-effect selection table even when a plurality of the host devices 3010 or the DFEs 3050 are provided, which is convenient for an administrator.

In the third embodiment, the plane data generating unit 3062, the print data generating unit 3063, and the clear processing unit 3066 are provided in the single server device 3060 on the cloud, and the server device 3060 performs the plane data generation process for generating the color plane data, the clear plane data, and the gloss-control plane data, the print data generation process, the surface-effect selection table determination process, and the clear-toner plane data generation process. However, the present invention is not limited to this example.

Figure 40:
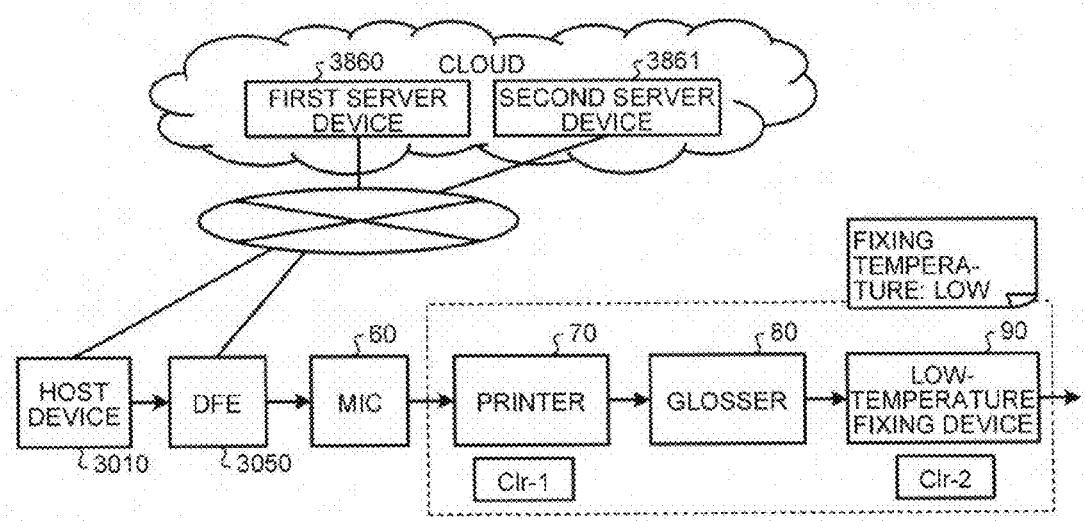
FIG. 40 is a diagram of a network configuration when two servers are provided on a cloud.

For example, it may be possible to provide two or more server devices on the cloud, and cause the two or more server devices to perform the above processes in a distributed manner. FIG. 40 is a network configuration diagram of a system in which two servers (a first server device 3860 and a second server device 3861) are provided on a cloud. In the example illustrated in FIG. 40, the first server device 3860 and the second server device 3861 are configured to perform the plane data generation process for generating the color plane data, the clear plane data, and the gloss-control plane data, the print data generation process, the surface-effect selection table determination process, and the clear-toner plane data generation process, in a distributed manner.

For example, the plane data generating unit 3062 and the print data generating unit 3063 may be provided in the first server device 3860 such that the first server device 3860 performs the plane data generation process and the print data generation process, and the clear processing unit 3066 may be provided in the second server device 3861 such that the second server device 3861 performs the surface-effect selection table determination process and the clear-toner plane data generation process. The way to distribute the processes to the servers is not limited to this example, and arbitrary ways may be applied.

Namely, if minimum components are provided in the host device 3010 or the DFE 3050, a part or the whole of the plane data generating unit 3062, the print data generating unit 3063, the clear processing unit 3066 may be integrated in one server device or may be distributed to a plurality of server devices in an arbitrary manner.

In other words, as described in the above example, any of the processes performed by one device may be performed by one or more other devices connected to the one device via a network.

The processes performed by "one or more other devices connected to one device via a network" include a data input-output process, such as a process for outputting data (information) generated by a process performed by the one device to the other device, a process for inputting data by the other devices, a process for inputting data between the one device, a process for inputting data by the other devices, and a process for inputting data between the other devices.

Specifically, when there is one other device, a data input-output process between the one device and the other device is included. When there are two or more other devices, data input-output process between the one device and the other devices and between the other devices, such as between a first other device and a second other device are included.

In the third embodiment, the server device 3060 or a plurality of the server devices such as the first server device 3860 and the second server device 3861 are provided on the cloud. However, the present invention is not limited to this example. For example, the server device 3060 or a plurality of the server devices such as the first server device 3860 and the second server device 3861 may be provided on any network, such as an intranet.

Figure 41:
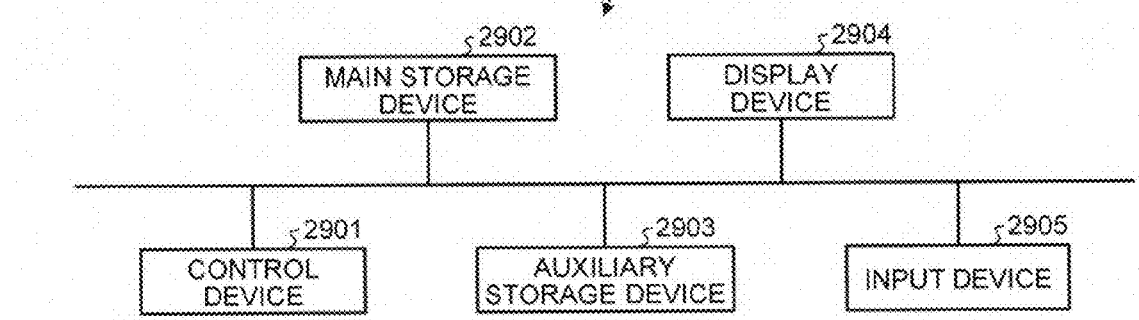
FIG. 41 is a diagram of a hardware configuration of the host devices, the DFEs, and the server devices.

A hardware configuration of the host devices 10 and 3010, the DFEs 50 and 3050, the server device 3060, the first server device 3860, and the second server device 3861 will be explained below. FIG. 41 is a diagram of a hardware configuration of the host devices 10 and 3010, the DFEs 50 and 3050, and the server device 3060. Each of the host devices 10 and 3010, the DFEs 50 and 3050, the server device 3060, the first server device 3860, and the second server device 3861 mainly includes, as a hardware configuration, a control device 2901, such as a CPU, that controls the entire device, a main storage device 2902, such as a ROM or a RAM, for storing various types of data and programs, an auxiliary storage device 2903, such as an HDD, for storing various types of data and programs, an input device 2905, such as a keyboard or a mouse, and a display device 2904, such as a display, and has the hardware configuration using a normal computer.

An image processing program (including the image processing application, and the same applies to the following explanation) executed by the host devices 10 and 3010 of the embodiments is stored in a computer-readable recording medium, such as a CD-ROM (Compact Disc-ROM), a flexible disk (FD), a CD-R (Compact Disc-Recordable), and a DVD (Digital Versatile Disk), in a computer-installable or a computer-executable file formed, and is distributed as a computer program product.

The image processing program executed by the host devices 10 and 3010 of the embodiments may be stored in a computer connected to a network, such as the Internet, and provided by being downloaded via the network. The image processing program executed by the host devices 10 and 3010 of the embodiments may be provided or distributed via a network, such as the Internet.

The image processing program executed by the host devices 10 and 3010 of the embodiments may be provided by being stored in advance in a ROM or the like.

The image processing program executed by the host devices 10 and 3010 of the embodiments has a module structure including the above units (the plane data generating unit, the print data generating unit, the input control unit, and the display control unit). As actual hardware, a CPU (processor) reads the image processing program from the storage medium and executes the image processing program, so that the above units are loaded on the main storage device and the plane data generating unit, the print data generating unit, the input control unit, and the display control unit are generated on the main storage device.

A print control process performed by the DFEs 50 and 3050 of the embodiments may be realized as a print control program as software, in addition to hardware. In this case, the print control program executed by the DFEs 50 and 3050 of the embodiments is provided by being stored in advance in a ROM or the like.

The print control program executed by the DFEs 50 and 3050 of the embodiments may be provided by being recorded in a computer-readable recording medium, such as a CD-ROM, an FD, a CD-R, and a DVD, in a computer-installable or a computer-executable file format, an may be provided as a computer program product.

The print control program executed by the DFEs 50 and 3050 of the embodiments may be stored in a computer connected to a network, such as the Internet, and provided by being downloaded via the network. The print control process performed by the DFE 50 of the embodiments may be provided or distributed via a network, such as the Internet.

The print control program executed by the DFEs 50 and 3050 of the embodiments has a module structure including the above units (the rendering engine, the halftone engine, the TRC unit, the si1 unit, the si2 unit, the si3 unit, and the clear processing unit). As actual hardware, a CPU (processor) reads the print control program from the ROM and executes the print control program, so that the above units are loaded on the main storage device, and the rendering engine, the halftone engine, the TRC unit, the si1 unit, the si2 unit, the si3 unit, and the clear processing unit are generated on the main storage device.

The data generation process performed by the server device 3060 of the above embodiment may be realized as a generation program as software, in addition to hardware. In this case, a data generation program executed by the server device 3060 of the above embodiment is provided by being stored in advance in a ROM or the like.

The data generation program executed by the server device 3060 of the above embodiment may be recorded in a computer-readable recording medium, such as a CD-ROM, an FD, a CD-R, and a DVD, in a computer-installable or a computer-executable file format, and may be provided as a computer program product.

The data generation program executed by the server device 3060 of the above embodiment may be stored in a computer connected to a network, such as the Internet, and provide by being downloaded via the network. The data generation program executed by the server device 3060 of the above embodiment may be provided or distributed via a network, such as the Internet.

The data generation program executed by the server device 3060 of the above embodiment has a module structure including the above units (the plane data generating unit, the print data generating unit, and the clear processing unit). As actual hardware, a CPU (processor) reads the generation program from the ROM and executes the generation program, so that the above units are loaded on the main storage device, and the plane data generating unit, the print data generating unit, and the clear processing unit are generated on the main storage device.

In the embodiments described above, the image forming system includes the host device 10 or 3010, the DFE 50 or 3050, the MIC 60, the printer 70, the glosser 80, and the low-temperature fixing device 90. However, the configuration is not limited to this example. For example, it may be possible to integrate the DFEs 50 and 3050, the MIC 60, and the printer 70 into one image forming apparatus. Furthermore, it may be possible to further provide the glosser 80 and the low-temperature fixing device 90 in the image forming apparatus.

In the image forming system of the embodiments described above, an image is formed by using a plurality of colors of CMYK. However, it may be possible to form an image by using a toner of a single color.

While the printer system of the embodiments includes the MIC 60, the present invention is not limited to this example. The process and the function of the MIC 60 may be provided to the other device, such as the DFE 50, and the MIC 60 may be omitted.

According to the embodiments, it is possible to obtain a surface effect desired by a user regardless of a sheet type.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print control apparatus comprising:
   a storage unit configured to store therein a plurality of surface-effect selection tables for respective pieces of recording medium information on a recording medium, different types of same surface effects being registered in each of the surface-effect selection tables;
   an acquiring unit configured to acquire a piece of recording medium information;
   a table generating unit configured to generate a surface-effect selection table corresponding to the acquired piece of recording medium information and store the generated surface-effect selection table in the storage unit when the acquired piece of recording medium information is not stored in the storage unit;
   a determining unit configured to determine the surface-effect selection table corresponding to the acquired piece of recording medium information from the storage unit;
   an image data generating unit configured to generate image data based on the determined surface-effect selection table and based on gloss-control plane data in which a type of a surface effect to be applied to the recording medium and an area of the recording medium to which the surface effect is to be applied are specified; and
   an output unit configured to output the image data.

2. The print control apparatus according to claim 1, further comprising an input control unit configured to receive a setting of pieces of evaluation information on respective patch images with different types of surface effects formed on a recording medium from a user, wherein
   when the acquired piece of recording medium information is not stored in the storage unit, the image data generating unit generates, as the image data, test chart data indicating the patch images based on test gloss-control plane data in which the patch images are designated and based on a predetermined surface-effect selection table,
   when the acquired piece of recording medium information is not stored in the storage unit, the table generating unit stores the predetermined surface-effect selection table and the pieces of evaluation information in association with each other in the storage unit to thereby generate a surface-effect selection table corresponding to the acquired piece of recording medium information, and
   the image data generating unit generates the image data based on the determined surface-effect selection table, the pieces of evaluation information corresponding to the surface-effect selection table, and the gloss-control plane data.

3. The print control apparatus according to claim 1, further comprising a determining unit configured to determine whether the acquired piece of recording medium information is stored in the storage unit, wherein
   when the determining unit determines that the acquired piece of recording medium information is not stored in the storage unit, the table generating unit generates a surface-effect selection table corresponding to the acquired piece of recording medium information and stores the surface-effect selection table in the storage unit.

4. The print control apparatus according to claim 2, wherein
   the input control unit further receives a setting of a piece of recording medium information from a user, and the determining unit determines a surface-effect selection table corresponding to the piece of recording medium information with the received setting from the storage unit.

5. The print control apparatus according to claim 3, wherein
the input control unit further receives a setting of a piece of recording medium information from a user, and
the determining unit determines a surface-effect selection table corresponding to the piece of recording medium information with the received setting from the storage unit.

6. The print control apparatus according to claim 1, further comprising an acquiring unit configured to acquire a piece of the recording medium information from a printing apparatus connected to a network, wherein
the determining unit determines a surface-effect selection table corresponding to the acquired piece of recording medium information from the storage unit.

7. The print control apparatus according to claim 1, wherein each piece of recording medium information contains at least one of a type of a recording medium, glossiness of the recording medium, and roughness information on the recording medium.

8. The print control apparatus according to claim 1, further comprising a clear-toner plane data generating unit configured to generate clear-toner plane data used to attach a colorless clear toner, based on the determined surface-effect selection table and the gloss-control plane data, wherein
the image data generating unit generates the image data based on color plane data used to attach a color toner and based on the clear-toner plane data.

9. The print control apparatus according to claim 1, wherein when the surface effect indicates specular gloss, the surface effect is registered in the surface-effect selection table such that an adhesion amount of a clear toner or a color toner is increased according to the piece of recording medium information.

10. The print control apparatus according to claim 1, a gloss control value for specifying a type of a surface effect and specifying an area of the recording medium to which the surface effect is to be applied is designated in the gloss-control plane data.

11. The print control apparatus according to claim 2, wherein
the input control unit further receives a piece of identification information for identifying a user from the user, and
the storage unit stores the surface-effect selection table for each piece of recording medium information and each piece of identification information.

12. The print control apparatus according to claim 3, wherein
the input control unit further receives a piece of identification information for identifying a user from the user, and
the storage unit stores the surface-effect selection table for each piece of recording medium information and each piece of identification information.

13. The print control apparatus according to claim 6, wherein
the input control unit further receives a piece of identification information for identifying a user from the user, and
the storage unit stores the surface-effect selection table for each piece of recording medium information and each piece of identification information.

14. The print control apparatus according to claim 7, wherein
the input control unit further receives a piece of identification information for identifying a user from the user, and
the storage unit stores the surface-effect selection table for each piece of recording medium information and each piece of identification information.

15. The print control apparatus according to claim 8, wherein
the input control unit further receives a piece of identification information for identifying a user from the user, and
the storage unit stores the surface-effect selection table for each piece of recording medium information and each piece of identification information.

16. The print control apparatus according to claim 9, wherein
the input control unit further receives a piece of identification information for identifying a user from the user, and
the storage unit stores the surface-effect selection table for each piece of recording medium information and each piece of identification information.

17. The print control apparatus according to claim 10, wherein
the input control unit further receives a piece of identification information for identifying a user from the user, and
the storage unit stores the surface-effect selection table for each piece of recording medium information and each piece of identification information.

18. The print control apparatus according to claim 1, wherein
the storage unit stores therein a type of a surface effect and a piece of recording medium information on a recording medium suitable for realizing the type of the surface effect in association with each other, and
the input control unit further receives a type of a surface effect from a user and causes a display unit to display a piece of recording medium information corresponding to the received type of the surface effect.

19. A print control system comprising:
a storage device configured to store therein a plurality of surface-effect selection tables for respective pieces of recording medium information on a recording medium, different types of same surface effects being registered in each of the surface-effect selection tables; and
circuitry configured to
acquire a piece of recording medium information,
generate a surface-effect selection table corresponding to the acquired piece of recording medium information and store the generated surface-effect selection table in the storage device when the acquired piece of recording medium information is not stored in the storage device,
determine the surface-effect selection table corresponding to the acquired piece of recording medium information from the storage device,
generate image data based on the determined surface-effect selection table and based on gloss-control plane data in which a type of a surface effect to be applied to the recording medium and an area of the recording medium to which the surface effect is to be applied are specified, and
output the image data.

20. A print control method comprising:
acquiring a piece of recording medium information on a recording medium;
generating a surface-effect selection table corresponding to the acquired piece of recording medium information and storing the generated surface-effect selection table in a storage device when the acquired piece of recording medium information is not stored in the storage device, the storage device being configured to store therein a plurality of surface-effect selection tables for respective pieces of recording medium information on the recording medium, different types of same surface effects being registered in each of the surface-effect selection tables;

determining the surface-effect selection table corresponding to the acquired piece of recording medium information from the storage device;

generating image data based on the determined surface-effect selection table and based on gloss-control plane data in which a type of a surface effect to be applied to the recording medium and an area of the recording medium to which the surface effect is to be applied are specified; and outputting the image data.

* * * * *